United States Patent
Omotowa

(10) Patent No.: US 8,367,026 B2
(45) Date of Patent: Feb. 5, 2013

(54) METHOD OF PRODUCING SULFUR TETRAFLUORIDE FROM URANIUM TETRAFLUORIDE

(76) Inventor: Bamidele A. Omotowa, Idaho Falls, ID (US)

( * ) Notice: Subject to any disclaimer, the term of this patent is extended or adjusted under 35 U.S.C. 154(b) by 5 days.

(21) Appl. No.: 12/916,276

(22) Filed: Oct. 29, 2010

(65) Prior Publication Data

US 2011/0104032 A1    May 5, 2011

Related U.S. Application Data

(60) Provisional application No. 61/279,999, filed on Oct. 29, 2009.

(51) Int. Cl.
*C01G 43/01* (2006.01)
*C01B 17/45* (2006.01)

(52) U.S. Cl. ............ 423/260; 423/2; 423/258; 423/467; 423/463; 423/497; 423/499.1; 423/499.4

(58) Field of Classification Search ............. 423/2, 260, 423/258, 467, 469, 497, 499.1, 499.4
See application file for complete search history.

(56) References Cited

U.S. PATENT DOCUMENTS

| | | | |
|---|---|---|---|
| 2,904,394 A | 9/1959 | Smith et al. | |
| 2,992,073 A | 7/1961 | Tullock et al. | |
| 3,373,000 A | 3/1968 | Pitts et al. | |
| 3,399,036 A | 8/1968 | Kleinberg et al. | |
| 3,848,064 A | 11/1974 | Becher et al. | |
| 3,950,498 A | 4/1976 | Appel | |
| 4,082,839 A | 4/1978 | Eibeck | |
| 4,372,938 A | 2/1983 | Oda | |
| 4,412,861 A * | 11/1983 | Kreuzmann | 75/399 |
| 4,744,960 A * | 5/1988 | Floreancig et al. | 423/10 |
| 4,859,441 A * | 8/1989 | Lambard | 423/259 |
| 5,340,447 A | 8/1994 | Bertaud | |
| 5,918,106 A * | 6/1999 | Bulko et al. | 423/260 |
| 7,776,302 B1 * | 8/2010 | Wildman | 423/260 |
| 2010/0260659 A1 * | 10/2010 | Winter | 423/469 |

* cited by examiner

*Primary Examiner* — Ngoc-Yen Nguyen

(74) *Attorney, Agent, or Firm* — Robert L. Shaver; Dykas & Shaver, LLP

(57) ABSTRACT

A method for converting depleted uranium tetrafluoride ($UF_4$) to triuranium octaoxide ($U_3O_8$), and producing sulfur tetrafluoride, using a two step process. The first step uses heat and a mixture of the uranium tetrafluoride and an alkaline compound, either an alkaline oxide or an alkaline hydroxide, to produce $U_3O_8$ and a water-soluble metal halide. The second step uses heat, sulfur and a halogen to produce sulfur tetrafluoride and triuranium octaoxide.

24 Claims, 15 Drawing Sheets

METHOD OF PRODUCING SULFUR TETRAFLUORIDE FROM URANIUM TETRAFLUORIDE

PRIORITY/CROSS-REFERENCE TO RELATED APPLICATIONS

This application claims the benefit of U.S. Provisional Application No. 61/279,999 filed Oct. 29, 2009, the disclosure of which is incorporated by reference.

TECHNICAL FIELD

The presently disclosed and claimed inventive concept(s) generally relates to a method for making triuranium octaoxide and more particularly to a method of making uranium-free sulfur tetrafluoride, and triuranium octaoxide from uranium tetrafluoride.

BACKGROUND

The current state-of-the-art in depleted uranium processing requires that $DUF_6$ tailings be converted into $DUF_4$ (depleted uranium tetrafluoride), which can be processed into metallic inorganic fluoride gases, like $GeF_4$, $SiF_4$, and $BF_3$. Pearlhill Technologies has just proved it is feasible to develop nonmetallic inorganic fluorides from uranium tetrafluoride (NIFUT) to produce sulfur tetrafluoride ($SF_4$) gas and triuranium octaoxide ($U_3O_8$) from depleted $UF_4$. Producing $SF_4$ opens the door to a whole range of metallic inorganic fluoride gases with established commercial markets. This project will contribute to uranium tailing management in the Excess Uranium Inventory Management Plan of the United States Department of Energy, by achieving viable large scale fluorine recovery for civilian market.

Currently, conversion processes involve either (i) hydrolysis of $DUF_6$ to produce $U_3O_8$, along with anhydrous hydrogen fluoride (HF); or (ii) using the fluorine extraction process (FEP) to produce commercially valuable metal fluorides, such as $BF_3$, $GeF_4$, $SiF_4$, and $U_3O_8$. This technology (i) is economically unviable; and the FEP technology for production of metallic fluorides, such as $BF_3$, $GeF_4$, and $SiF_4$, appears to be viable for production of very expensive high purity gas product grades that are priced to pay for the high cost of production. While the FEP is profitable for production of expensive, limited-volume specialty products like $GeF_4$, it is still to be proven viable for bulk gases $BF_3$, and $SiF_4$, respectively.

Meanwhile, DOE has 700,000 metric tons of $UF_6$ that can be recovered into useful marketable fluorinated products. United States Enrichment Corporation (USEC), Louisiana Energy Services (LES), AREVA Inc., and General Electric (GE) have all either announced plans to build, or are building new nuclear fuel enrichment facilities in the United States. When these facilities are completed, at their initial stated capacity, they will produce approximately 60 million pounds of $DUF_6$ tails each year. $DUF_6$ cannot be disposed of directly, but must be converted into disposable waste forms. There are very few facilities in the U.S. today that can convert depleted $DUF_6$ tails. This patent presents the most effective and economically viable alternative technology for fluoride recovery from $UF_6$.

SUMMARY

The innovation is an energy efficient, two-step process for production of uranium free $SF_4$ from $UF_4$, called nonmetallic inorganic fluoride from uranium tetrafluoride (NIFUT) technology. The uranium byproduct of the processes in this technology is pure $U_3O_8$ and a water-soluble metal halide. It produces uranium-free $SF_4$ gas from a room temperature reaction that can be operated for large scale production of commercially valuable $SF_4$, at a competitive cost with the alternative current industrial. NIFUT technology can produce high quality $SF_4$, to be used by manufacturers of active pharmaceutical ingredients (APIs), agrochemicals, inorganic chemicals, and fluoropolymers.

The invention is a method for converting depleted uranium tetrafluoride ($UF_4$) to uranium free sulfur tetrafluoride ($SF_4$) and triuranium octaoxide ($U_3O_8$). This method starts with the first step which is heating a mixture of uranium tetrafluoride and an alkaline compound. These two reagents can be heated at various temperatures, with 350° C. to 650° C. being a typical range. The two reagents are heated in a reaction chamber for 60-240 minutes. The reaction chamber is flushed with dry air from a gas reservoir. Off gases from the reaction of the first step occur, and are passed through a filter to prevent particulate uranium from escaping from the reaction chamber.

The next step is allowing a mixture of the uranium containing product from the first step, combined with sulfur (S) and a halogen to be place in the same reactor. This process is operated at a temperature of approximately 25-80° C., for varying times including 96 hours to 120 hours. The heating of the uranium containing product along with sulfur (S) and a halogen produces sulfur tetrafluoride ($SF_4$) gas, and solid byproducts of a metal halide salt and $U_3O_8$ has to be at temperatures below 400° C. that is favorable for re-fluorination of $U_3O_8$ to produce $UF_6$.

The reactant defined above as an alkaline compound can take the form of either an alkaline oxide or an alkaline hydroxide. The alkaline oxides which have proven favorable for this reaction include cesium oxide, calcium oxide, and potassium oxide. An alkaline oxide for use in the reaction above can be selected from the group consisting of calcium oxide, cesium oxide, and potassium oxide. The preferred halogen is chlorine, although bromine is also a suitable and a preferred halogen.

One version of the method described above utilizes cesium fluoride (CsF) to combine with sulfur, and a halogen reagent to produce tetrafluoride ($SF_4$) in the second step. The second step of this version of the reaction could utilize bromine or chlorine, with chlorine being preferred. This version of the reaction can be conducted at 25-80° C. for 96-120 hours.

Another embodiment of the method of the invention utilizes cesium hydroxide and uranium tetrafluoride in a reaction chamber at 350-650° C., for 60-240 minutes in the first step. The second step of this version of the reaction preferably utilizes chlorine with bromine also being suitable as a halogen.

Among the alkaline hydroxides which may be utilized for step one of this method are potassium hydroxide and cesium hydroxide.

Another embodiment of the method of the invention utilizes cesium carbonate and uranium tetrafluoride in a reaction chamber at 350-650° C., for 60-240 minutes in the first step. The second step of this version of the reaction preferably utilizes chlorine with bromine also being suitable as a halogen.

Among the alkaline carbonates which may be utilized for step one of this method are potassium carbonate and cesium carbonate.

The method can be operated using the reagents potassium hydroxide and chlorine, potassium hydroxide and bromine, cesium hydroxide and chlorine, or cesium hydroxide and bromine.

Similarly, sodium oxide, potassium oxide, cesium oxide potassium carbonate, and cesium carbonate can be utilized with either chlorine or bromine.

The method can be conducted at various temperatures and times including 400-600° F. Step two of the method can also be conducted at 80° C. or less for less than 10 hours utilizing bromine as the halogen.

The atmosphere in which the heating step of step one is conducted would typically be dry air, which flushes the reaction chamber and causes off gases to go to a KOH scrubber. Step two of the method utilizes a cryogenic condenser to collect the $SF_4$ gas.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects without departing from the inventive concept(s). Accordingly, the drawings and description of the preferred embodiments are to be regarded as illustrative in nature, and not as restrictive in nature.

DETAILED DESCRIPTION OF THE PREFERRED AND EXEMPLARY EMBODIMENTS

Figure 1:
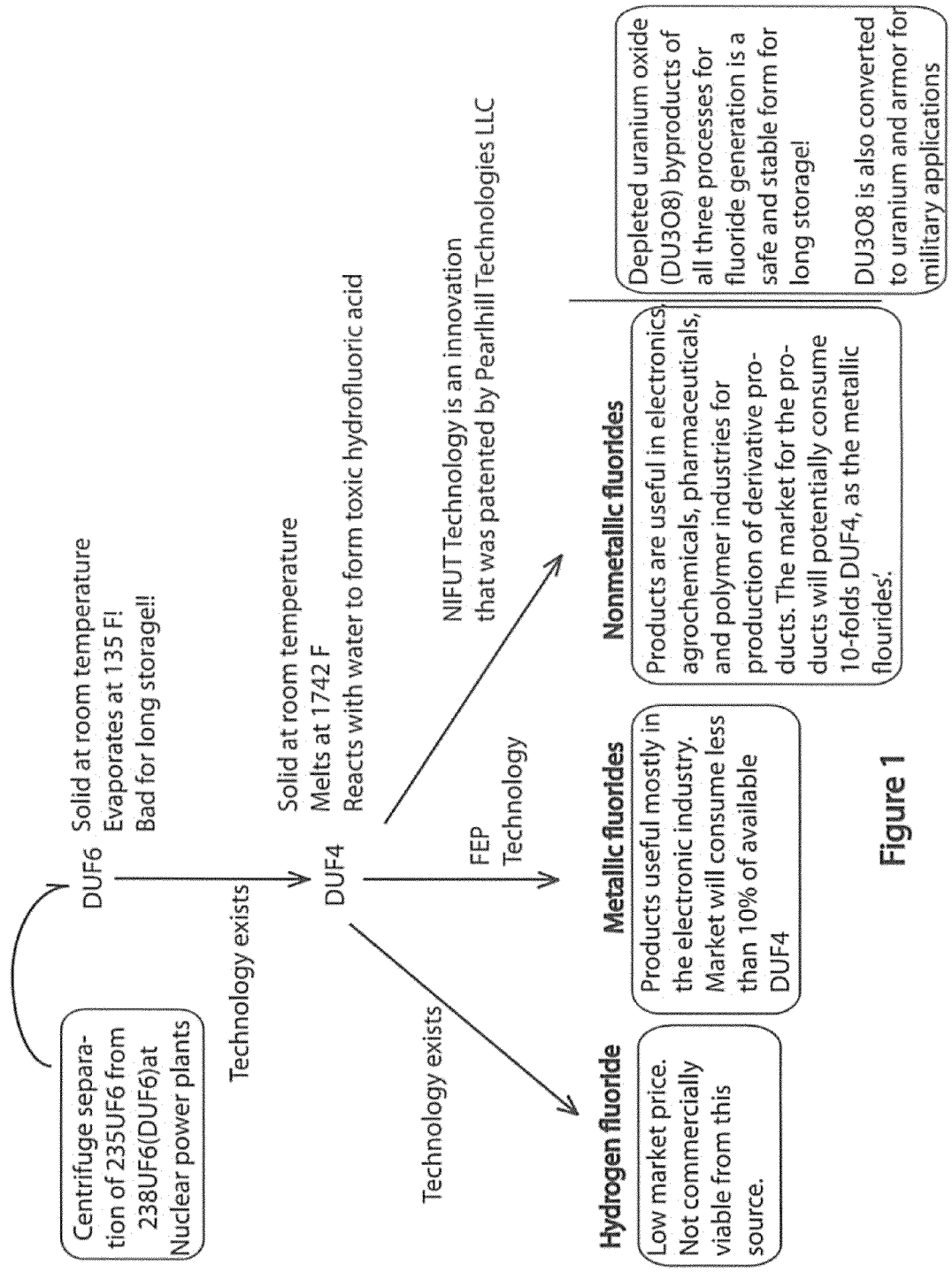
FIG. 1 is a diagram of NIFUT production of nonmetallic fluoride gases from $DUF_4$ and other available alternative technologies for fluoride recovery from $DUF_4$.
Figure 2:
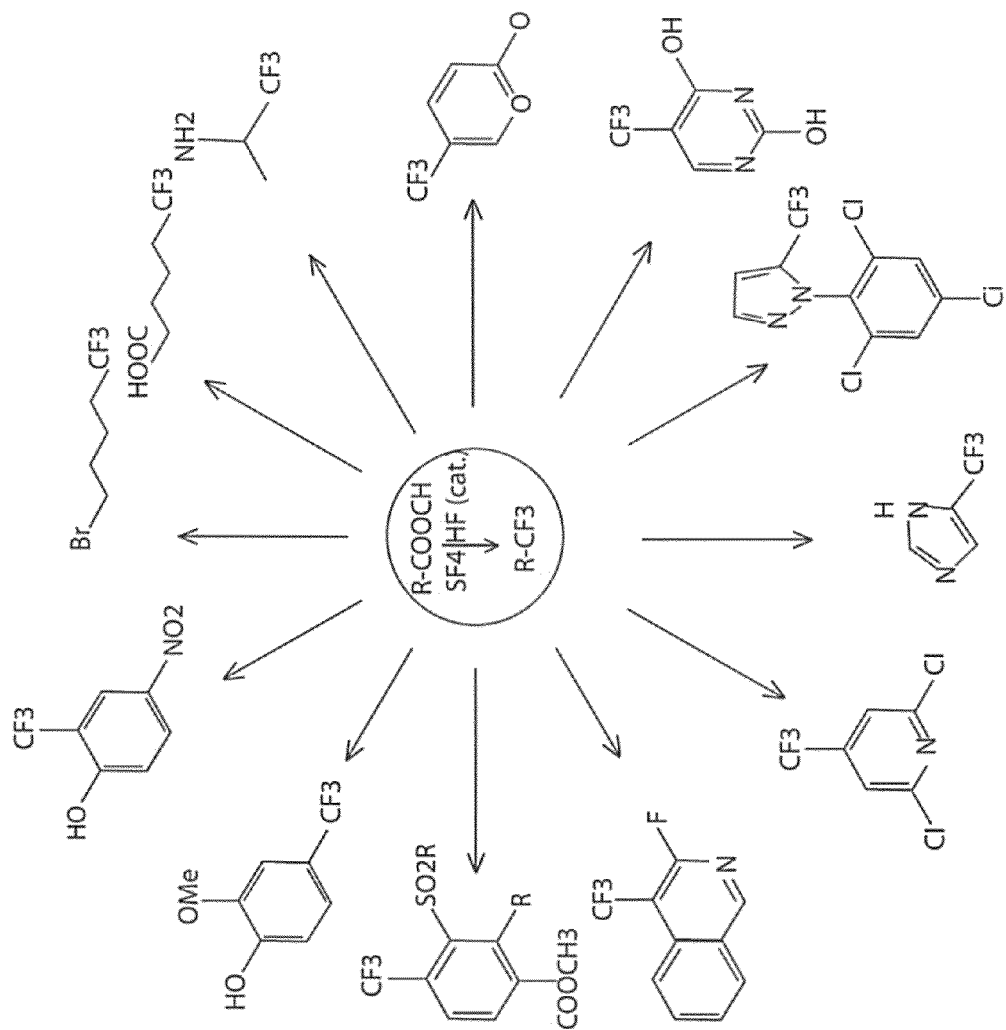
FIG. 2 shows uses of $SF_4$ combined with carboxylic acids in pharmaceuticals and agrochemicals.
Figure 3:
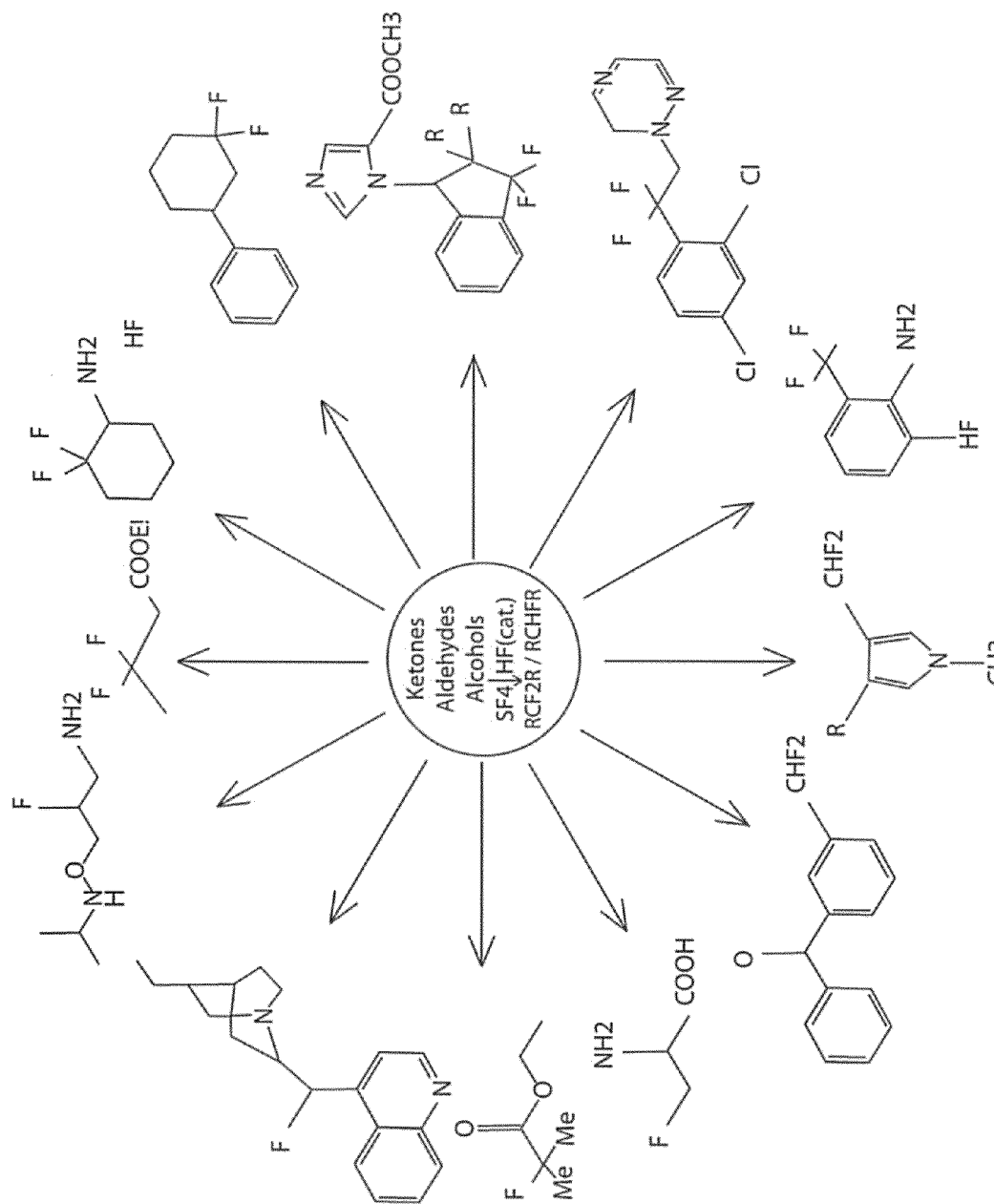
FIG. 3 shows uses of $SF_4$ combined with ketones, aldehydes, or alcohols in pharmaceuticals and agrochemicals.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims A preferred embodiment of the method is the production of sulfur tetrafluoride ($SF_4$) from uranium tetrafluoride by a two-step process. This process results in nonmetallic inorganic fluorides from uranium tetrafluoride (NIFUT) to produce sulfur tetrafluoride ($SF_4$) gas and triuranium octaoxide ($U_3O_8$) from depleted $UF_4$. This process is shown in FIG. 1. The production of sulfur tetrafluoride is commercially valuable because when $SF_4$ is combined with carboxylic acids, many products useful in pharmaceuticals and agrochemicals can be made, as shown in FIG. 2. When $SF_4$ is combined with ketones, aldehydes, or alcohols, many products useful in pharmaceuticals and agrochemicals can be made, as shown in FIG. 3.

Step One: The first step of this particular embodiment of the method is to combine a mixture of uranium tetrafluoride ($UF_4$, a green solid) and an alkaline compound, such as sodium oxide or cesium oxide ($Na_2O$—$Na_2O_2$ or $Cs_2O$, white solids). An alkaline oxide, alkaline carbonate, or an alkaline hydroxide can be used, such as sodium oxide, sodium hydroxide, cesium carbonate, cesium oxide, cesium hydroxide, potassium oxide, potassium carbonate, or potassium hydroxide. The next step is heating to 400° C. with sufficient air present, for 15 hours. Heating to 600° C. produced complete conversion of $UF_4$ within 4 hr. The reaction at 400° C. achieves about 70% conversion after 15 h. The products of the reaction are, and will have, an orange-grey and grey color, respectively. The uranium byproduct of the processes in this technology is pure $U_3O_8$ and a water-soluble metal halide.

The quantities of uranium tetrafluoride and alkali metal oxide, as an example, can be in the range of 314 g of uranium tetrafluoride to mass equivalent of 1 mole of alkali metal oxide In the preferred embodiment, heat is applied to the stainless steel reactor or other suitable container using a Lindberg Blue heater, a Parr heater, or other suitable heating apparatus and methods can be used.

Figure 13:
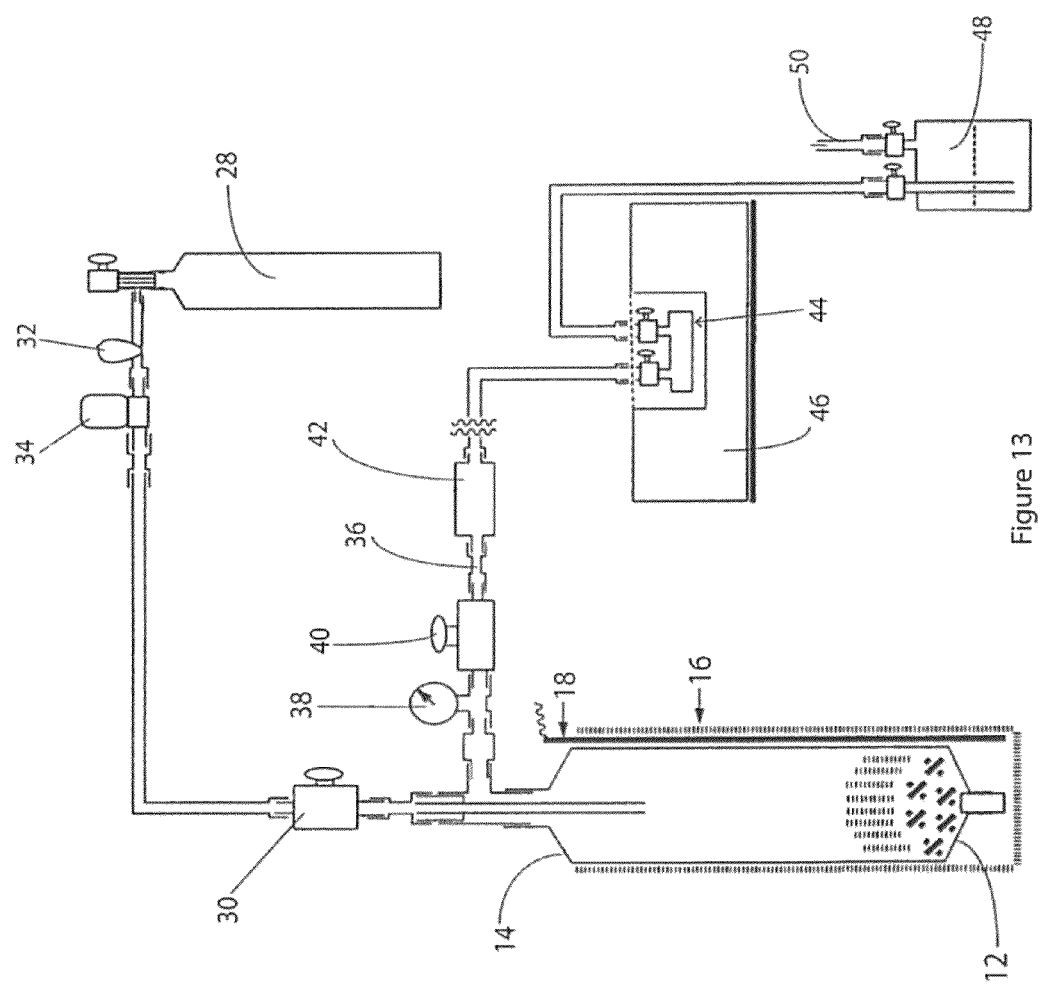
FIG. 13 is a diagram of the laboratory scale apparatus for $SF_4$ production for step one.
Figure 14:
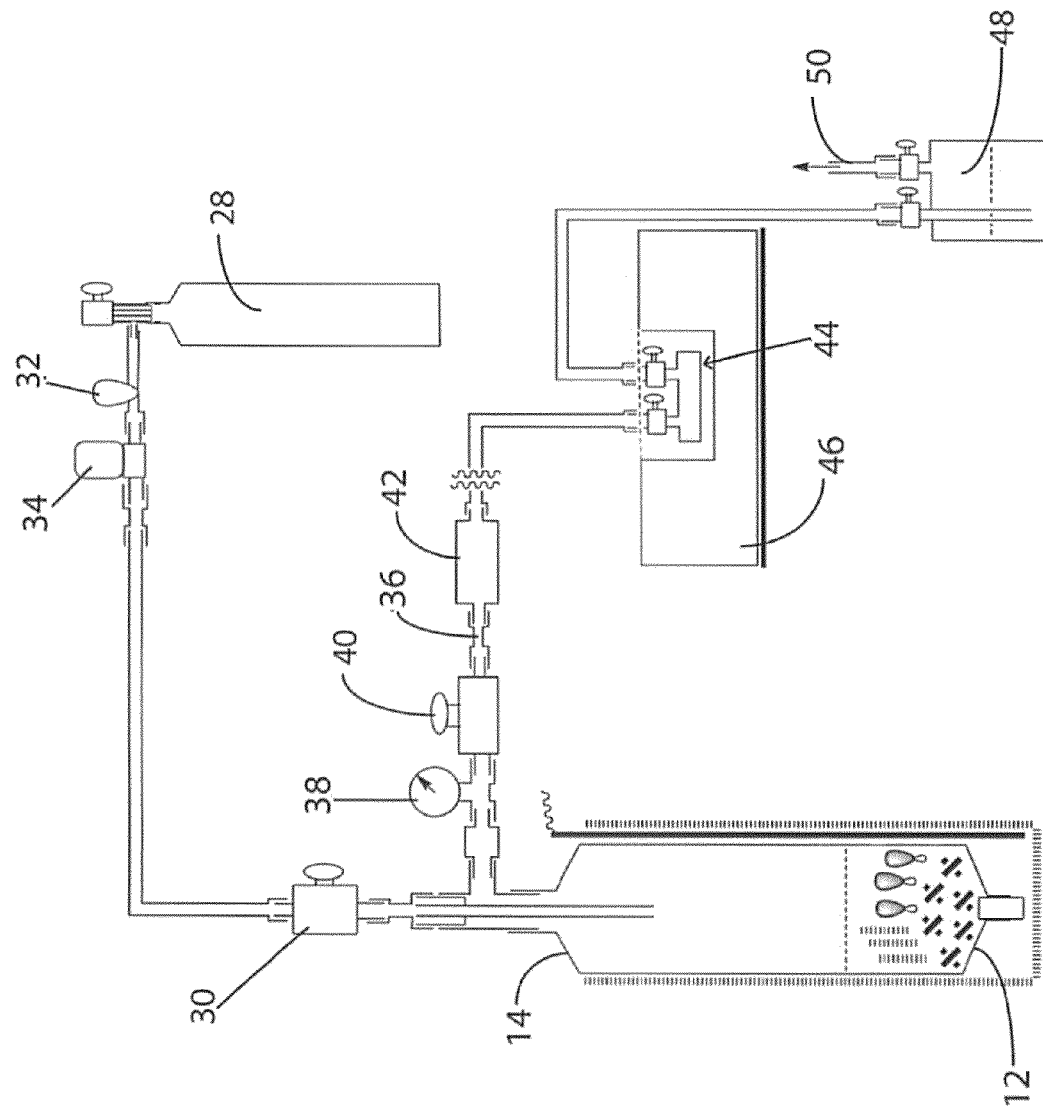
FIG. 14 is a diagram of the laboratory scale apparatus for $SF_4$ production, for step two.
Figure 15:
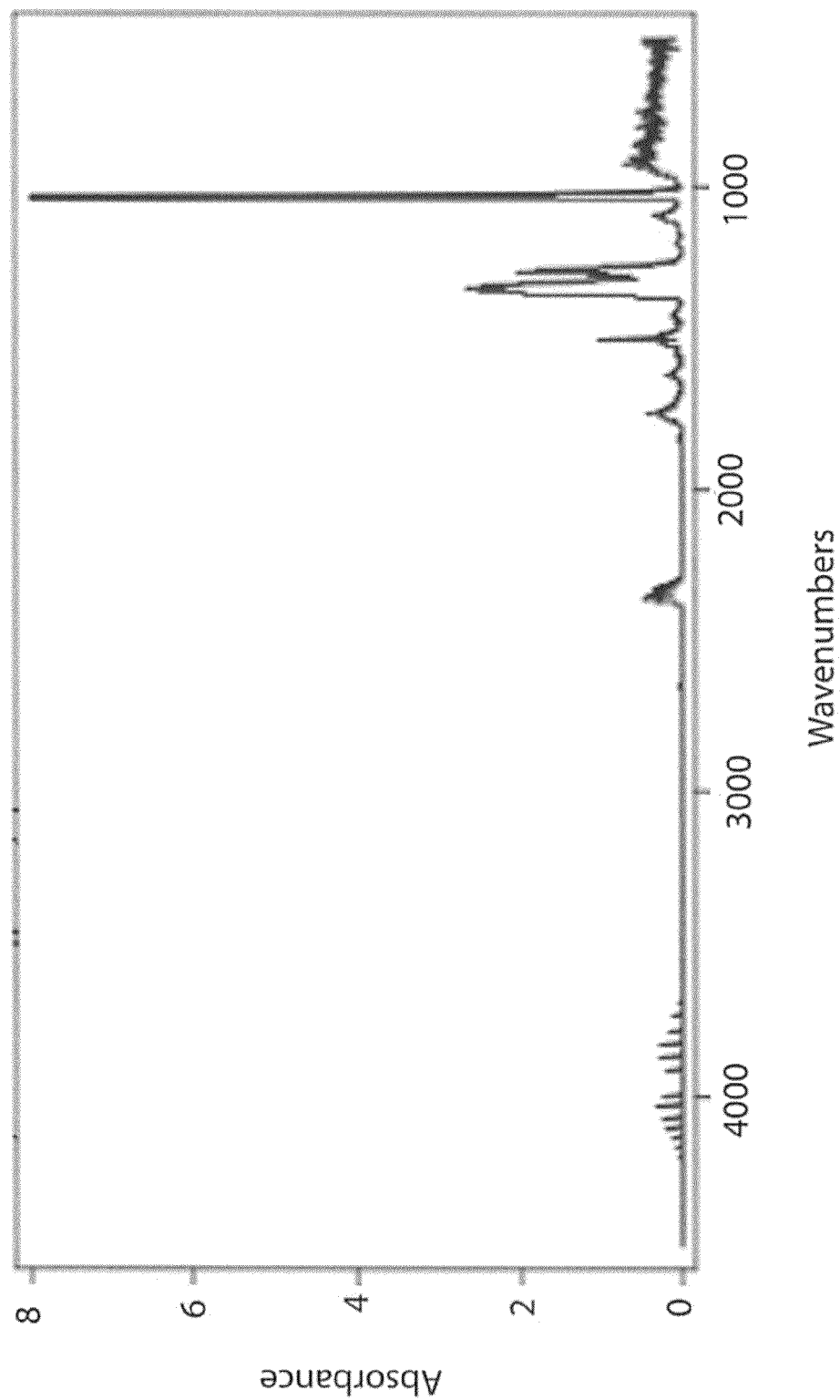
FIG. 15 is a graph of FTIR absorbance spectrum of 30% $SF_4$.

An alternative preferred embodiment involves the reaction of uranium tetrafluoride and cesium hydroxide (CsOH) or potassium hydroxide (KOH) at 450° C. in the presence of air, and over 12 h, resulted in the production of corresponding anhydrous fluoride salts, i.e. CsF and KF, and $U_3O_8$ as the uranium byproduct A preferred production apparatus for carrying out the method 10 is shown in FIGS. 13 and 14, and would be scaled up for large scale production, with equivalent equipment to the equipment shown in the laboratory scale embodiment. Shown in FIG. 13 is a 304 or 316 L stainless steel cylinder 14 which serves as a crucible or reaction vessel, and a heat source 16. A thermocouple 18 is present to monitor the temperature of the reaction chamber 14.

Attached to the stainless steel cylinder 14 is a T coupling, with the T coupling in the laboratory scale version being a 1 inch stainless fitting with a 1 inch top opening 22, and a 1 inch side opening 24. Inserted into the top opening 22 is a gas line 26, in this case made of stainless steel, although Hastelloy C, Monel, or other suitable material could be utilized for the gas line 26.

The gas line 26 extends to a dry air source 28, with an inline valve 30, pressure regulator 32, and mass flow meter 34 being present on the gas line 26. The dry air source supplies air to flush the gases from the reaction chamber 14.

Attached to the side opening 24 is a 1 inch outflow line 36, with a gauge 38, a valve 40, and a filter 42. The material of the outflow line is preferably stainless steel in the laboratory scale setup, but could also be Teflon, Hastelloy C, or Monel, or any suitable material in a larger production model. The purpose of the filter 42 is to prevent any particulate uranium from leaving the reaction vessel 14, and a suitable filter is a 0.3 micrometer Pall's Gaskleen V filter, although other suitable filters may be used.

Gas passing through the filter 42 is routed through the online gas cell 44 which is located in analytical instrumentation 46 to test for the composition of volatile effluents. Effluents pass through the gas cell 44, to either a cryogenically cooled condenser or a KOH scrubber 48, and are vented from the KOH scrubber 48 through a vent 50. In the laboratory scale setup, the preferred analytical instrumentation is a Fourier Transform Infrared (FTIR) spectrometer, or a gas chromatograph (GC). The KOH scrubber is approximately 5 L in volume, and contains 1-5 M KOH, and would be scaled up for larger production.

The reactivity's of MgO, CaO, or $Na_2O$ with $UF_4$ were determined over a wide range of temperature. The process involved addition of stoichiometric quantities of each oxide with $UF_4$, and heating to 600° C. for 30 minutes. The physical look of the products vs. starting materials were photographed, showing color change from white (metal oxide, $MO_x$) or green ($UF_4$) to grey final color. In the case of 80:20 $Na_2O$—$Na_2O_2$, there was a separate yellow-red colored product that stayed on top of the grey powder. Powder X-Ray diffraction (XRD) data confirm that the reaction of $UF_4$ was rapid and complete, producing $U_3O_8$, and the respective metal fluorides.

However, the effort to produce $SF_4$ from the reaction of (i) $NaF/S/Br_2$, (ii) $MgF_2/S/Br_2$, or (iii) $CaF_2/S/Br_2$ at room temperature was unsuccessful. The computerized study evaluation of thermodynamic feasibility of conversion of the metal fluorides to $SF_4$ was undertaken using the HSC 7.0 software. The results are summarized in Tables 1 to 7 as in FIGS. 11 and 12. The results showed that the best candidates were CsF and KF.

The most practicable commercial approach to producing KF or CsF from $UF_4$ involved dehydration of the mixture of the metal hydroxide and $UF_4$ at 600° C., with flowing air. The only byproducts are dry $U_3O_8$ and the respective metal fluoride ($MF_n$). When this product has been sufficiently dehydrated, the $MF_n$ represents the best chemical reagent for production $SF_4$, in the presence of $U_3O_8$; and resulting in <10,000 ppm of $SOF_2$ and HF.

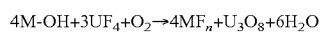

$$4M\text{-}OH+3UF_4+O_2\rightarrow 4MF_n+U_3O_8+6H_2O$$

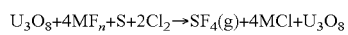

$$U_3O_8+4MF_n+S+2Cl_2\rightarrow SF_4(g)+4MCl+U_3O_8$$

Early investigation of this approach produced encouraging results. When the mixtures of (i) $CsF/S/Cl_2$, ad (ii) $CsF/S/Br_2$ were allowed to sit at room temperature, 75%, and 60% conversion of $S/Cl_2$ to $SF_4$ had occurred within 72 h. Although, these two processes resulted in the production of $SF_4$, the byproduct from $CsF/S/Br_2$ was a messy brown viscous liquid! This will complicate the clean up of $U_3O_8$, a make the process an uncomfortable task because of the presence of residual bromine. On the other hand, the gas-solid process of $CsF/S/Cl_2$ produced $SF_4$ and light yellow CaCl/CsF solid mixture, which changed to white on standing in the hood. Thus, on the basis of the kinetic advantages, better thermodynamic feasibility, and less complex byproducts stream, the $CsF/S/Cl_2$ process was selected for study of the $U_3O_8$—$CsF/S/Cl_2$ and $U_3O_8$—$KF/S/Cl_2$ systems. The progress of the reaction can be monitored by Fourier Transform infrared (FTIR) spectrometer. The yield of the process was studied by recording the pressure in batch processes at (a) RT; and (b) 80° C./8 h. The general balanced equation shows that the product ($SF_4$) pressure will be half as much as the reagent gas ($Cl_2$) pressure.

A successful process must prevent the conversion of $U_3O_8$ to $UF_6$. $SF_4$ reacts with $UO_2$, $UO_3$, and $U_3O_8$ to produce $UF_6$ at 100, 300 and 400° C., respectively. Therefore, the ideal commercial process must operate at or below 100° C. The $KOH/UF_4$, $CsOH.H_2O/UF_4$, and the resultant $U_3O_8$—$KF/S/Cl_2$ and $U_3O_8$—$CsF/S/Cl_2$ processes were assembled according to the set up in FIGS. 13 and 14. Kinetic information was obtained by recording changes in pressure periodically. The reaction of cesium hydroxide (CsOH) and $UF_4$ to produce $CsF/U_3O_8$ is thermodynamically favored (see Table 1), and was carried out at 600° C. to ensure complete dehydration of CsF produced.

Figure 4:
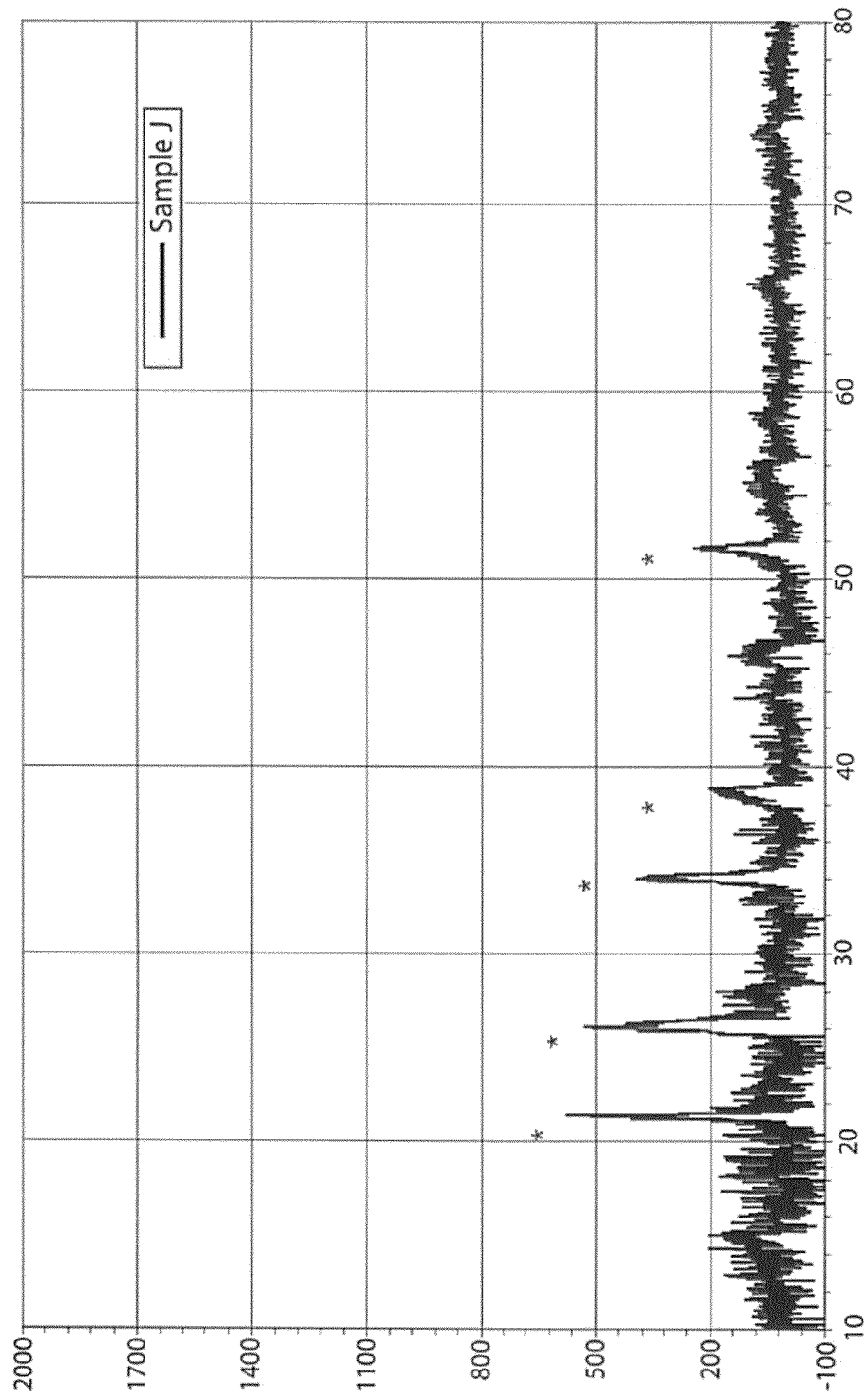
FIG. 4 shows the presence of $U_3O_8$ in the X-Ray diffraction (XRD) pattern of a sample after stoichiometric mixture of $Na_2O$—$Na_2O_2$ (80:20) and $UF_4$ were heated at 600° C. for one hour.

FIG. 4 shows the presence of $U_3O_8$ in the X-Ray diffraction (XRD) pattern of a sample "J" after step 1 of the method, after stoichiometric mixture of $Na_2O$—$Na_2O_2$ (80:20) and $UF_4$ were heated at 600° C. for one hour.

Figure 5:
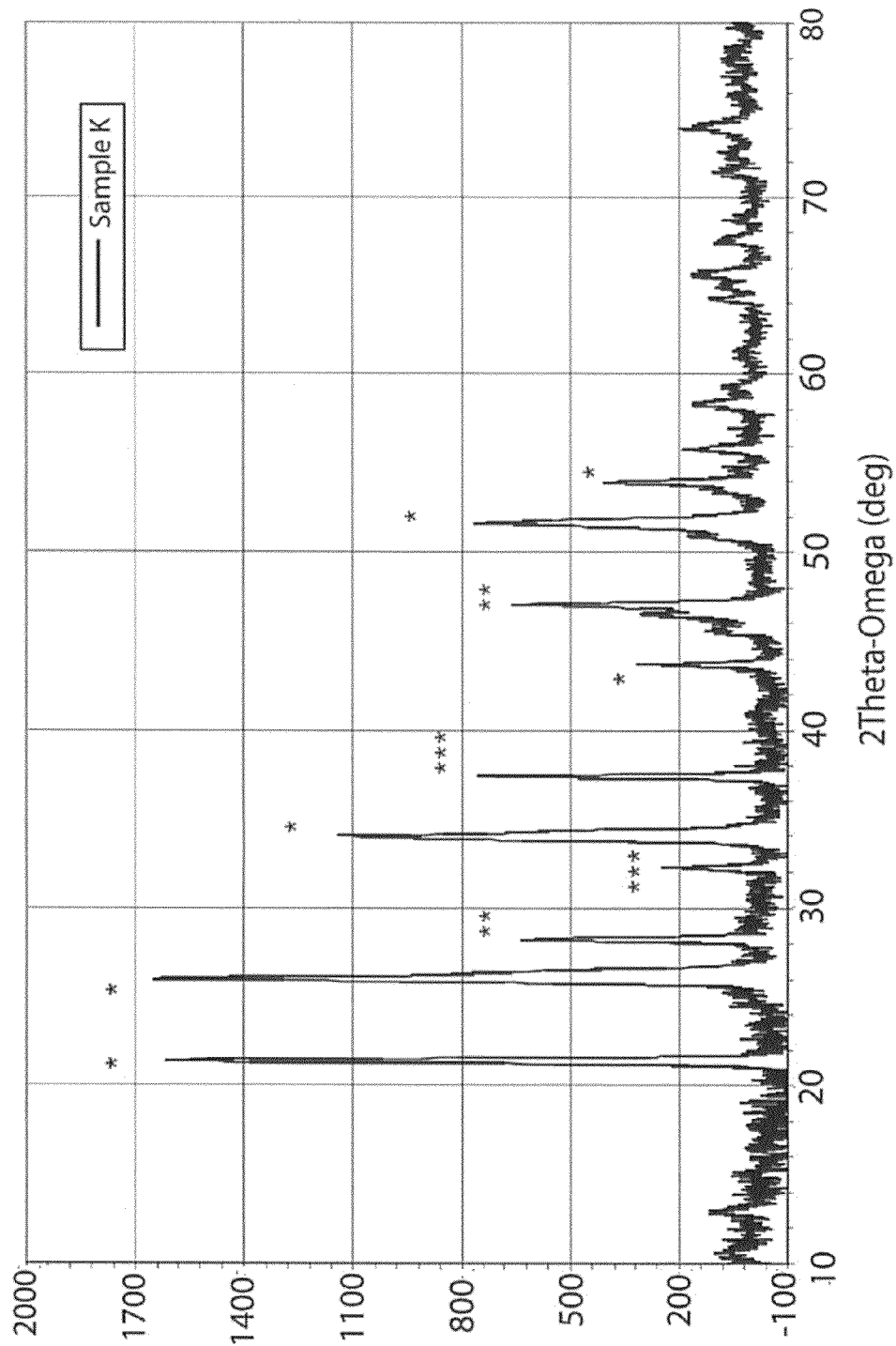
FIG. 5 shows the presence of $U_3O_8$ in the X-Ray diffraction (XRD) pattern of a sample after stoichiometric mixture of CaO and $UF_4$ were heated at 600° C. for one hour.

FIG. 5 shows the presence of $U_3O_8$ in the X-Ray diffraction (XRD) pattern of a sample "K" after step 1 of the method, after stoichiometric mixture of CaO and $UF_4$ were heated at 600° C. for one hour.

Figure 6:
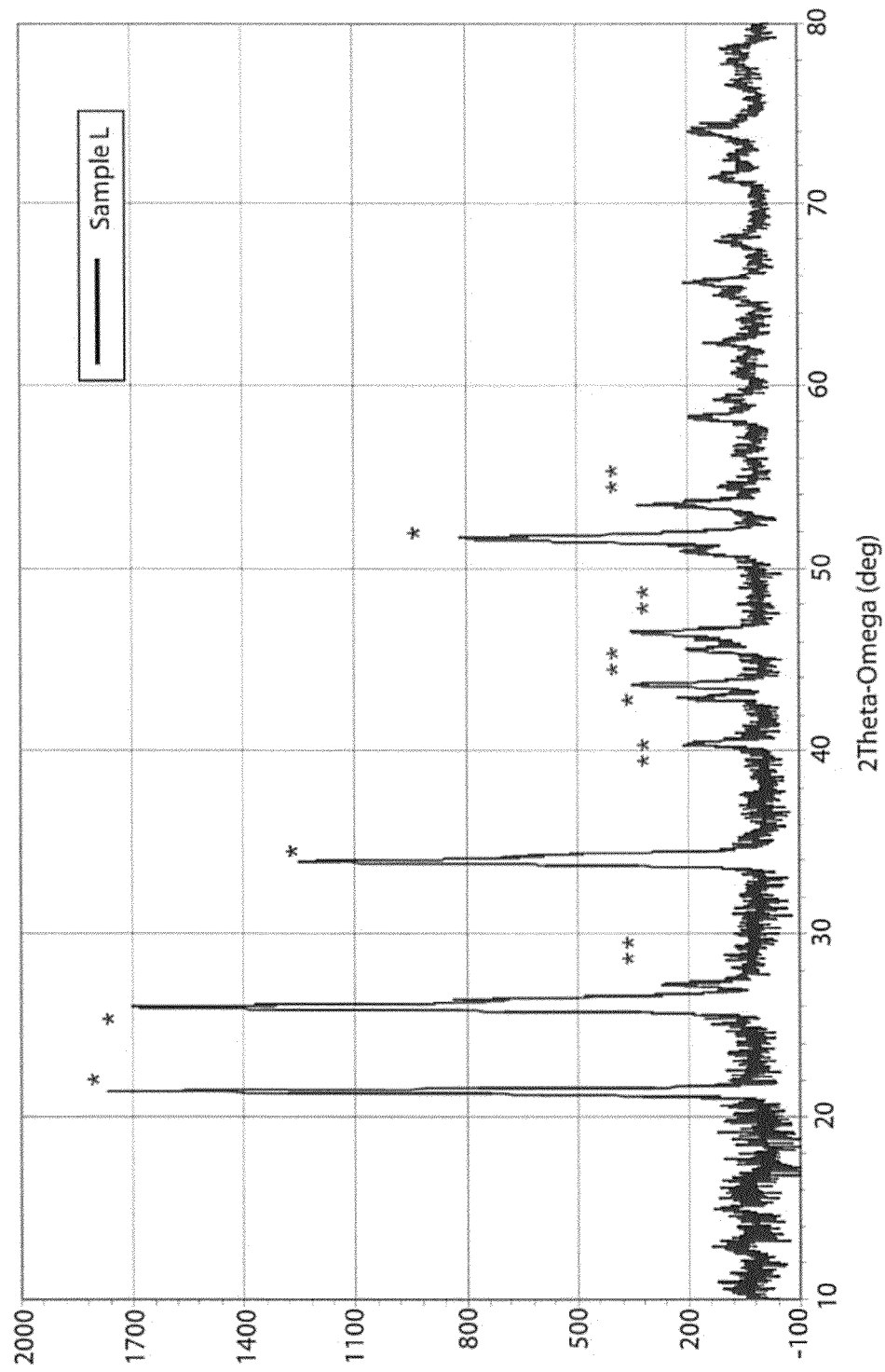
FIG. 6 shows the presence of $U_3O_8$ in the X-Ray diffraction (XRD) pattern of a sample after stoichiometric mixture of MgO and $UF_4$ were heated at 600° C. for one hour.

FIG. 6 shows the presence of $U_3O_8$ in the X-Ray diffraction (XRD) pattern of a sample "L" after step 1 of the method, after stoichiometric mixture of MgO and $UF_4$ were heated at 600° C. for one hour.

Figure 7:
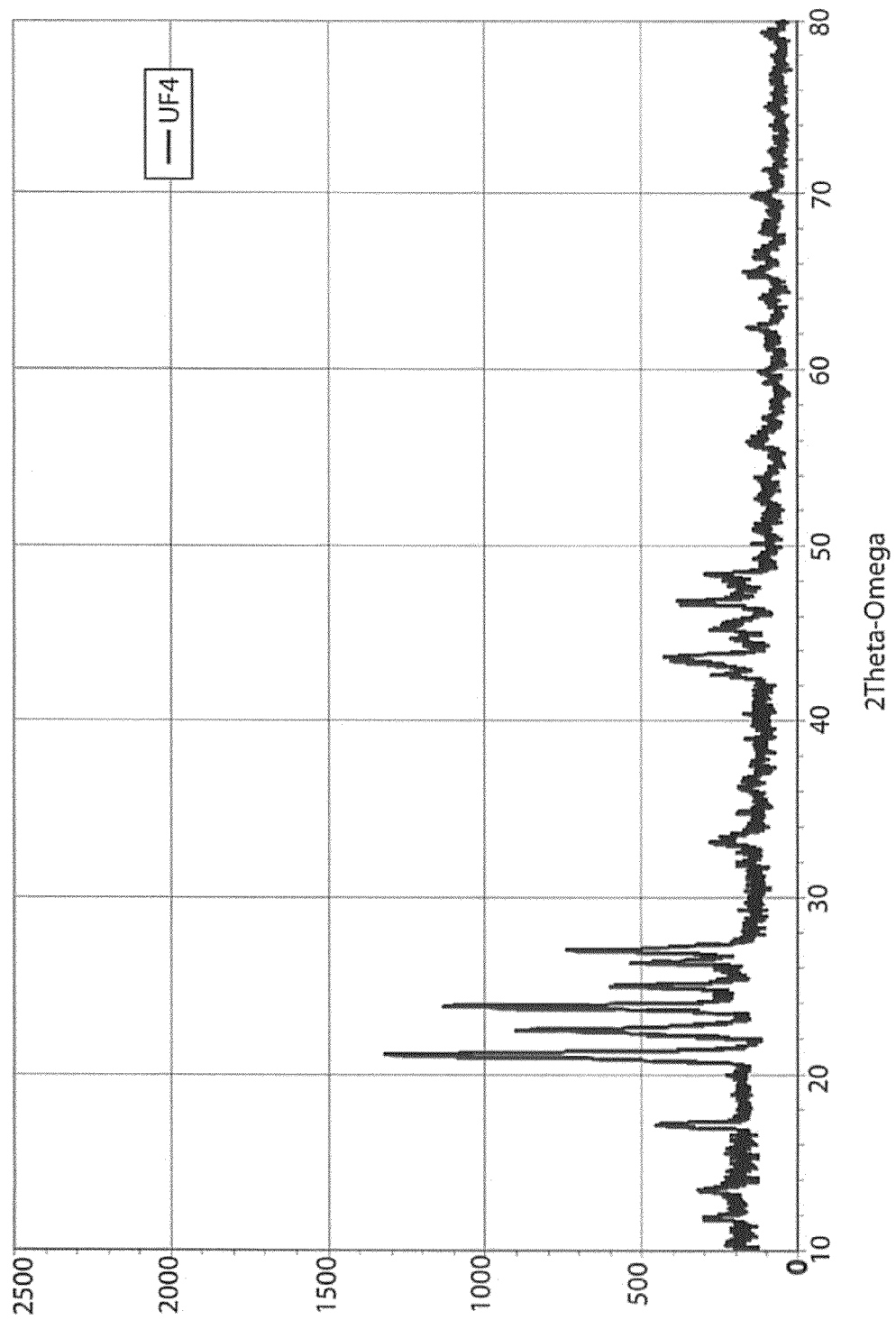
FIG. 7 shows XRD pattern for $UF_4$ as reference for identification of uranium by products of steps 1 and 2.

FIG. 7 shows XRD pattern for $UF_4$ as reference for identification of uranium byproducts of steps 1 and 2.

Figure 8:
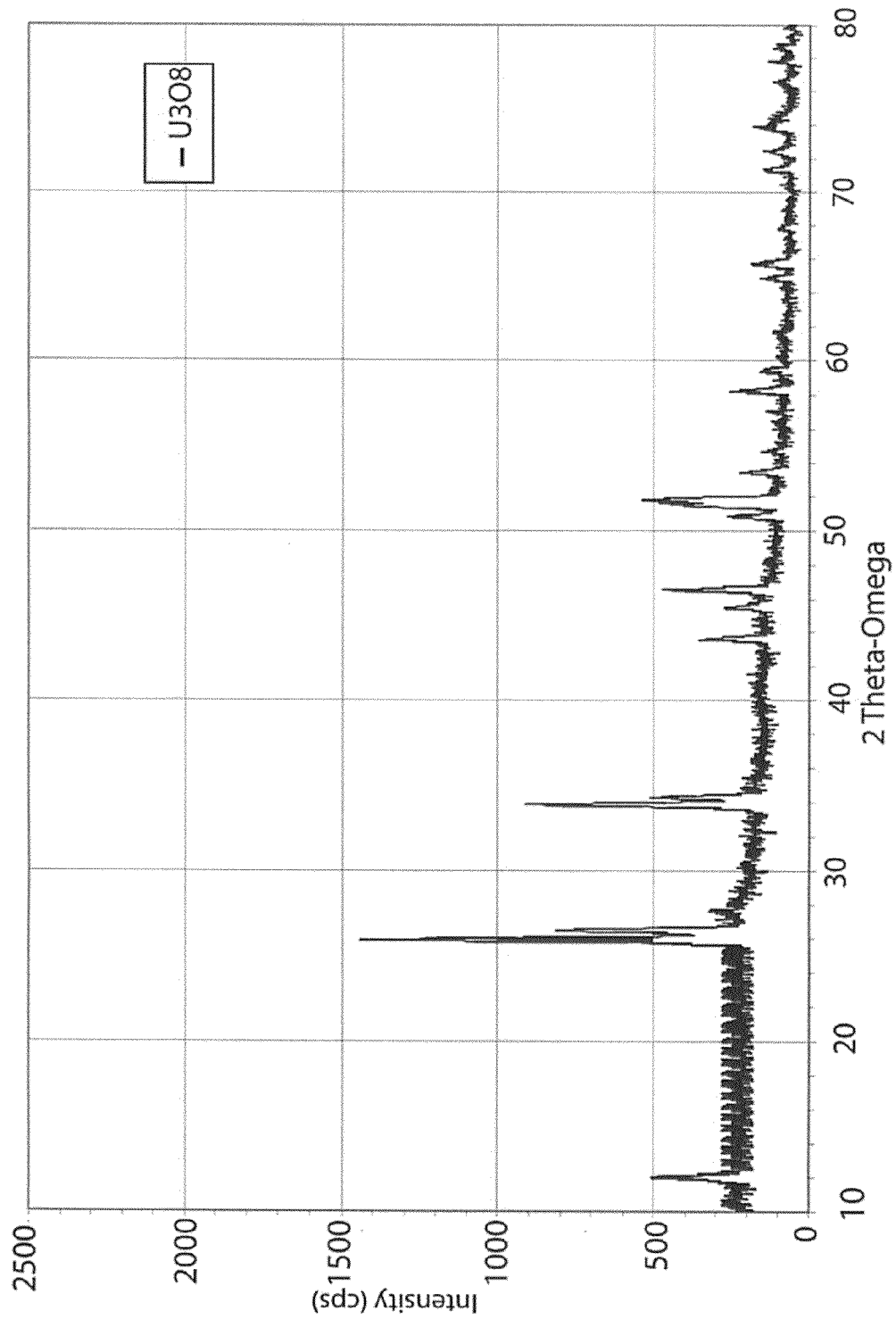
FIG. 8 shows XRD pattern for $U_3O_8$ as reference for identification of uranium byproducts of steps 1 and 2.

FIG. 8 shows XRD pattern for $U_3O_8$ as reference for identification of uranium byproducts of steps 1 and 2.

Figure 9:
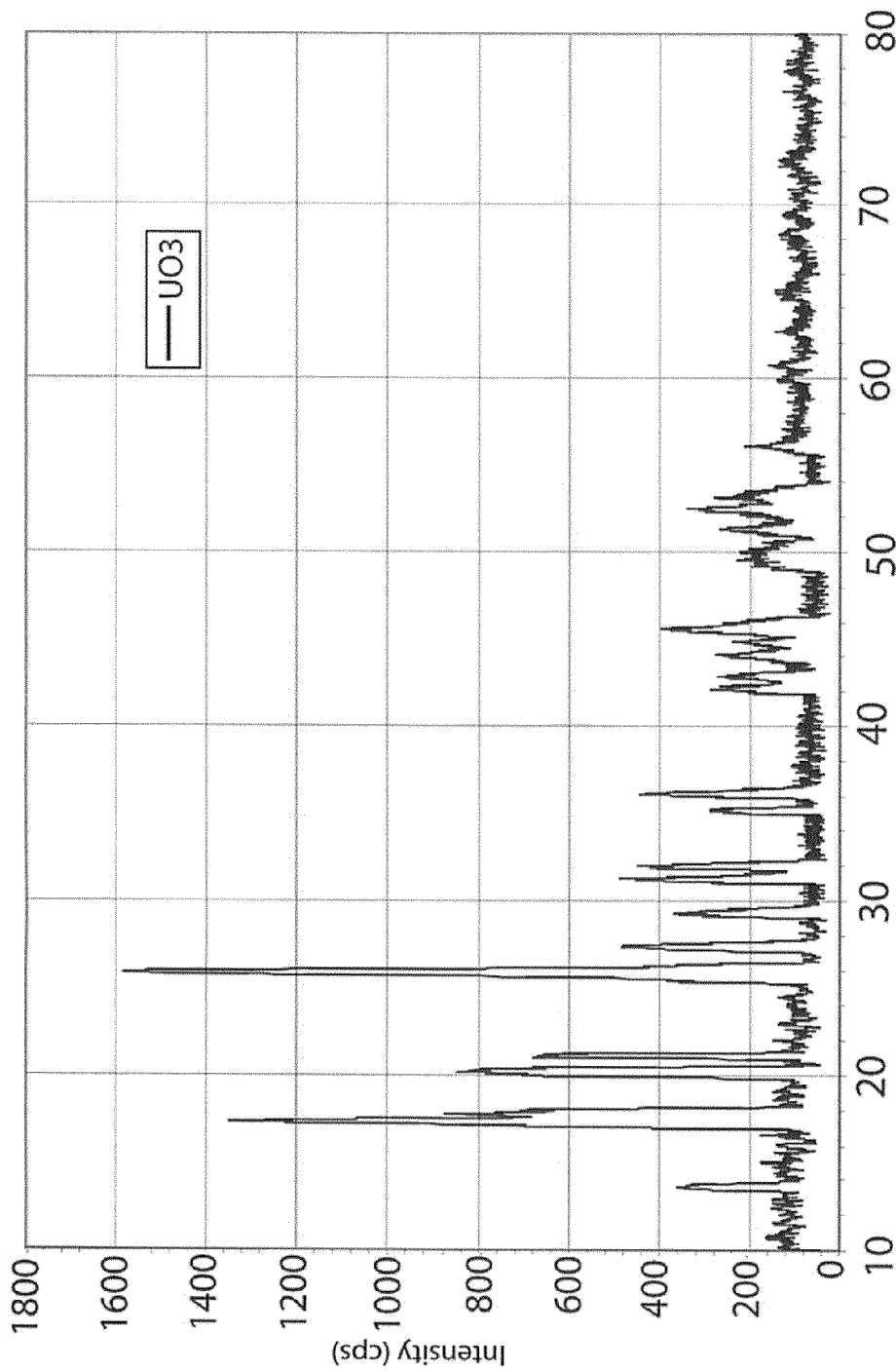
FIG. 9 shows XRD pattern for $UO_3$ as reference for identification of uranium byproducts of steps 1 and 2.

FIG. 9 shows XRD pattern for $UO_3$ as reference for identification of uranium byproducts of steps 1 and 2.

Figure 10:
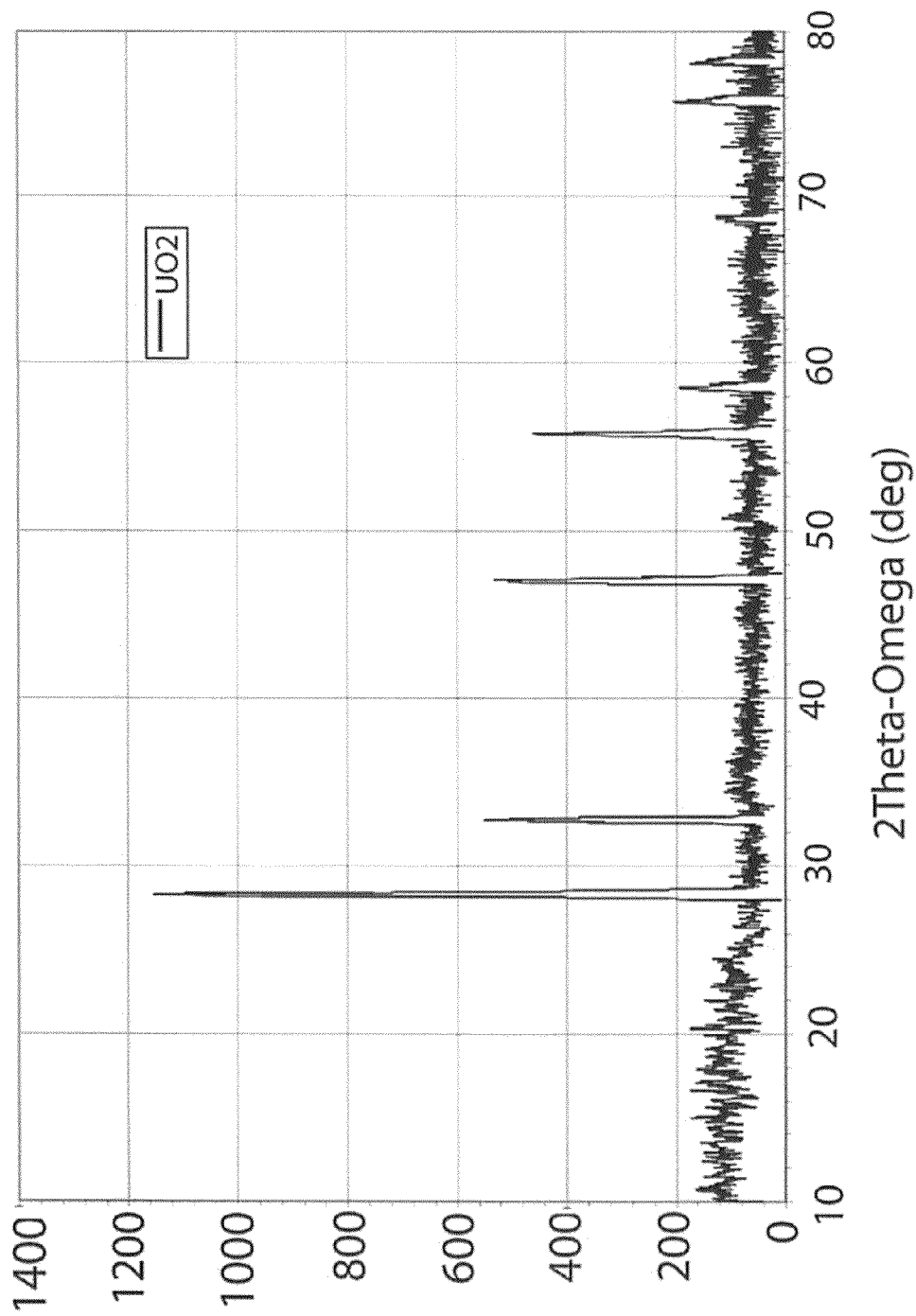
FIG. 10 shows XRD pattern for $UO_2$ as reference for identification of uranium byproducts of steps 1 and 2.

FIG. 10 shows XRD pattern for $UO_2$ as reference for identification of uranium byproducts of steps 1 and 2.

Step Two: The second step of the two-step process involves adding powdered sulfur (S) and a halogen, such as bromine ($Br_2$) or chlorine ($Cl_2$), to the mixture of $U_3O_8$—CsF or $U_3O_8$—KF (from step 1); and stirring this in a reactor at room temperature for 3 hrs to 200 hrs, with 120 hours being typical, to produce sulfur tetrafluoride ($SF_4$) gas in quantitative conversion, with the solid byproducts being alkaline halide, and $U_3O_8$.

Stoichiometric quantities of sulfur (S) and a halogen such as bromine ($Br_2$) or chlorine ($Cl_2$) are added to the mixture of $U_3O_8$—CsF (from step 1) at the rate of 3 mass parts S, 15 mass parts $Cl_2$ (for instance) and 36-38 mass parts $U_3O_8$—CsF.

At this temperature, $SF_4$ (produced from step 2) did not react with $U_3O_8$ (from step 1). $SF_4$ has a vapor pressure of 145 PSIG at 21° C., and is compressible as liquid in the reactor. The gas can be removed from the reactor at room temperature by passing the >99% pure $SF_4$ product through a 0.3 micrometer Pall's Gaskleen V filter to prevent any particulate uranium from leaving the reactor. While a description of the Batch process has been given, this process can be adapted for continuous flow process The reaction of cesium hydroxide (CsOH) and $UF_4$ to produce $CsF/U_3O_8$ is thermodynamically favored (see Table 1), and was carried out at 600° C. to ensure dehydration of CsF produced. The reaction of potassium hydroxide and $UF_4$ was previously studied by others.

TABLE 1

| 12 CsOH + 3 $UF_4$ + $O_2$ (g) → 12 $C_sF$ + $U_3O_8$ + 6 $H_2O$ | | | | | |
|---|---|---|---|---|---|
| T C | H Kcal | S cal/K | G Kcal | K | Log(K) |
| 100.000 | −295.014 | −3.790 | −293.600 | 9.385E+171 | 171.972 |
| 200.000 | −293.680 | −0.655 | −293.370 | 3.311E+135 | 135.520 |
| 300.000 | −305.976 | −25.725 | −291.232 | 1.148E+111 | 111.060 |
| 400.000 | −311.765 | −36.289 | −287.337 | 1.980E+093 | 93.297 |
| 500.000 | −303.628 | −25.033 | −284.274 | 2.310E+080 | 80.364 |
| 600.000 | −294.667 | −14.143 | −282.318 | 4.679E+070 | 70.670 |

Table 1 shows equilibrium constant (K) as indication of thermodynamic feasibility of quantitative fluoride recovery from $UF_4$ to form cesium fluoride (CsF).

Stoichiometric quantities of sulfur (S) and a halide such as bromine ($Br_2$) or chlorine ($Cl_2$) are added to the mixture of $U_3O_8/CsF$ (from step 1) at the rate of 3 parts S, 15 parts $Cl_2$ (for instance) and 36-38 parts $U_3O_8/CsF$.

The temperature-dependent thermodynamic equilibrium constant (K) data in Tables 1 and 2 below show that using $CsF/S/Cl_2$ or $CsF/S/Br_2$ to produce $SF_4$ gas will be the most thermodynamically feasible approach, when compared to conventional methods of $KF/S/Br_2/25-70°$ C. (Tables 3) or $NaF/S/Cl_2/92°$ C. (Table 4). The reactions in Tables 1 and 2 produced yields of 95-100% at 25° C./24 h or 70° C./5 h (Table 5).

TABLE 2

| S + 2$Cl_2$ (g) + 4 CsF → $SF_4$ (g) + 4 CsCl | | | | | |
|---|---|---|---|---|---|
| T C | H Kcal | S cal/K | G Kcal | K | Log(K) |
| 25.000 | −72.658 | −35.562 | −62.055 | 3.102E+045 | 45.492 |
| 50.000 | −72.704 | −35.709 | −61.164 | 2.342E+041 | 41.370 |
| 100.000 | −72.877 | −36.192 | −59.372 | 5.975E+034 | 34.776 |
| 150.000 | −73.445 | −37.640 | −57.517 | 5.119E+029 | 29.709 |
| 200.000 | −73.751 | −38.325 | −55.618 | 4.923E+025 | 25.692 |

Table 2 shows equilibrium constant (K) as indication of thermodynamic feasibility of using the reactivity of sulfur (S) and chlorine ($Cl_2$) for quantitative fluoride transfer from CsF to produce $SF_4$ and cesium chloride (CsCl) as byproducts.

TABLE 3

| S + 2 $Br_2$ (g) + 4 CsF → $SF_4$ (g) + 4 CsBr | | | | | |
|---|---|---|---|---|---|
| T C | H Kcal | S cal/K | G Kcal | K | Log(K) |
| 25.000 | −52.338 | −35.011 | −41.899 | 5.196E+030 | 30.716 |
| 50.000 | −52.400 | −35.211 | −41.022 | 5.568E+027 | 27.746 |

TABLE 3-continued

| S + 2 $Br_2$ (g) + 4 CsF → $SF_4$ (g) + 4 CsBr | | | | | |
|---|---|---|---|---|---|
| T C | H Kcal | S cal/K | G Kcal | K | Log(K) |
| 100.000 | −52.615 | −35.814 | −39.251 | 9.790E+022 | 22.991 |
| 150.000 | −53.225 | −37.368 | −37.413 | 2.111E+019 | 19.325 |
| 200.000 | −53.565 | −38.128 | −35.525 | 2.572E+016 | 16.410 |

Table 3 shows equilibrium constant (K) as indication of thermodynamic feasibility of using the reactivity of sulfur (S) and chlorine ($Cl_2$) for quantitative fluoride transfer from CsF to produce $SF_4$ and cesium chloride (CsCl) as byproducts.

TABLE 4

| S + 2 $Br_2$ (g) + 4 KF → $SF_4$ (g) + 4 KBr | | | | | |
|---|---|---|---|---|---|
| T C | H Kcal | S cal/K | G Kcal | K | Log(K) |
| 25.000 | −30.923 | −26.030 | −23.162 | 9.535E+016 | 16.979 |
| 50.000 | −30.947 | −26.110 | −22.510 | 1.678E+015 | 15.225 |
| 100.000 | −31.071 | −26.452 | −21.201 | 2.618E+012 | 12.418 |
| 150.000 | −31.563 | −27.710 | −19.837 | 1.764E+010 | 10.247 |
| 200.000 | −31.753 | −28.135 | −18.441 | 3.300E+008 | 8.519 |

Winter, R; Cook, P. W., In A simplified and efficient bromine-facilitated $SF_4$-preparation method, J. Fluorine Chem. 2010, 131, 780-783

Table 4 shows equilibrium constant (K) and thermodynamic feasibility of using the reactivity of sulfur (S) and bromine ($Br_2$) for quantitative fluoride transfer from potassium fluoride (KF) to produce $SF_4$ and potassium chloride (KCl) as byproducts.

TABLE 5

| S + 2$Cl_2$ (g) + 4 NaF → $SF_4$ (g) + 4 NaCl | | | | | |
|---|---|---|---|---|---|
| T C | H Kcal | S cal/K | G Kcal | K | Log(K) |
| 25.000 | −24.197 | −23.411 | −17.217 | 4.184E+012 | 12.622 |
| 50.000 | −24.186 | −23.374 | −16.632 | 1.777E+011 | 11.250 |
| 100.000 | −24.251 | −23.547 | −15.465 | 1.143E+009 | 9.058 |
| 150.000 | −24.696 | −24.687 | −14.250 | 2.293E+007 | 7.360 |
| 200.000 | −24.846 | −25.022 | −13.007 | 1.019E+006 | 6.008 |

1. Tullock, C. W.; Fawcett, F. S.; Smith, W. C.; Coffman, D. D., In The Chemistry of Sulfur Tetrafluoride. I. The Synthesis of Sulfur Tetrafluoride, J. Amer. Chem. Soc. 1960, 82, 539-542
2. Appel, R; Gilak, A., In Process for the production of sulfur tetrafluoride, U.S. Pat. No. 3,950,498, 1976
3. Oda; Y., Otouma; H., Uchida; K., Morikawa; S., Ikemura; M., In Producing sulfur tetrafluoride using amine/hydrogen fluoride complex, U.S. Pat. No. 4,372,938, 1983

Table 5 shows equilibrium constant (K) and thermodynamic feasibility of using the reactivity of sulfur (S) and chlorine $Cl_2$ for quantitative fluoride transfer from sodium fluoride (NaF) to produce $SF_4$ and Sodium chloride (NaCl) as byproducts.

TABLE 6

Logarithm of equilibrium constants (log K) for the reactions of alkaline/alkaline earth metal fluorides and chlorine for production of SF4 as an indication of thermodynamic feasibility

| S + 2$Cl_2$ (g) + 4 $MF_n$ → $SF_4$ (g) + 4 $MCl_n$ |
|---|

Table 6 shows Logarithm of equilibrium constants (log K) for the reaction of alkaline/alkaline earth metal fluorides and chlorine for the production of $SF_4$ as an indication of thermodynamic feasibility.

X-Axis:
1=25° C.
2=50° C.
3=100° C.
4=150° C.
5=200° C.
6=N/A

| Metal fluoride | Temperature | | | | |
|---|---|---|---|---|---|
| | 25° C. | 50° C. | 100° C. | 150° C. | 200° C. |
| NaF | 12.62 | 11.25 | 9.06 | 7.36 | 6.01 |
| KF | 36.03 | 32.77 | 27.55 | 23.55 | 20.37 |
| CsF | 45.49 | 41.37 | 34.78 | 29.71 | 25.69 |
| RbF | 40.65 | 37.05 | 31.30 | 26.87 | 23.36 |
| $MgF_2$ | −41.62 | −38.87 | −34.48 | −31.14 | −28.53 |
| $CaF_2$ | −23.20 | −21.82 | −19.61 | −17.96 | −16.68 |

TABLE 7

Logarithm of equilibrium constants (log K) for the reactions of alkaline/alkaline earth metal fluorides and bromine for production of $SF_4$ as an indication of thermodynamic feasibility
$S + 2Br_2 (g) + 4 MF_n \rightarrow SF_4 (g) + 4 MCl_n$

| Metal fluoride | Temperature | | | | |
|---|---|---|---|---|---|
| | 25° C. | 50° C. | 100° C. | 150° C. | 200° C. |
| NaF | −10.81 | −10.31 | −9.51 | −8.93 | −8.48 |
| KF | 16.89 | 15.23 | 12.42 | 10.25 | 8.52 |
| CsF | 30.72 | 27.75 | 22.99 | 19.33 | 16.41 |
| RbF | 23.90 | 21.66 | 18.07 | 15.29 | 13.09 |
| $MgF_2$ | −71.27 | −66.19 | −58.06 | −51.88 | −47.02 |
| $CaF_2$ | −51.55 | −47.98 | −42.28 | −37.96 | −34.57 |

Table 7 shows Logarithm of equilibrium constants (log K) for the reaction of alkaline/alkaline earth metal fluorides and bromine for the production of $SF_4$ as an indication of thermodynamic feasibility. These values are shown in graph form in FIG. 12.

Overall, determination of the feasibility of producing $SF_4$ from $CsF/U_3O_8$ at room temperature has established that:

NIFUT Technology will produce high quality $SF_4$ at a cost competitive process vs. conventional processes Production of $SOF_2$, a typical byproduct in the production of $SF_4$, is minimized to <2%

Large scale (e.g. ton scale) production of $SF_4$ can be carried out in batch process, over several days Since $SF_4$ vapor pressure is 145 PSIG at 70° F., and the gas is condensable, it can be separated from the solid/solid reaction phase At reaction temperature, $U_3O_8$ (produced in step 1) does not react with $SF_4$. Reaction of $U_3O_8/SF_4$ has been reported at 300° C.

Example Embodiments

While certain exemplary embodiments are discussed in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

Example 1

Reaction of Uranium Tetrafluoride and Potassium Hydroxide

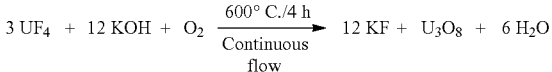

$$3 UF_4 + 12 KOH + O_2 \xrightarrow[\text{Continuous flow}]{600° C./4 h} 12 KF + U_3O_8 + 6 H_2O$$

Step One: 35.2 g (0.112 mol) Uranium tetrafluoride (International Bio-Analytical Laboratories Inc, Boca Raton, Fla.) and 22.5 g (0.402 mol) crushed potassium hydroxide pellets (Sigma Aldrich Co.) were placed in a 300 cc stainless steel cylinder that was then fitted into a set up illustrated in FIG. 13. A PALL Gaskleen V filter was placed in the outlet of the continuous flow of 550 standard cubic centimeter (sccm) dry air through the cylinder reactor. The supply of dry air is carefully controlled through online regulator and mass flow meter. The heater is powered on, and controlled to 600° C. for 4 h. During this period, droplets of water from the reaction were noticeable in the hose that connects the vent to the KOH scrubber. Any residual water was removed by vacuum of the isolated reactor, through the Gaskleen filter. Flow of dry air continued after heater power was turned off, until the temperature dropped to 100° C. Powder X-Ray diffraction of the resulting byproduct of this process showed that all $UF_4$ had reacted, and that $U_3O_8$ was the only uranium byproduct. Based on reaction stoichiometry, 3.6 g water should be eliminated from the reactor in a quantitative conversion, and weight loss of 7.2 g was confirmed. Thus, the reactor would contained 23.3 g (0.402 mol) KF, and 31.56 g (0.034 mol) $U_3O_8$.

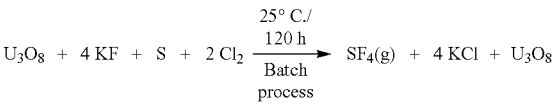

$$U_3O_8 + 4 KF + S + 2 Cl_2 \xrightarrow[\text{Batch process}]{25° C./120 h} SF_4(g) + 4 KCl + U_3O_8$$

Step Two: The reactor was opened under inert atmosphere, and then 3.0 g (0.094 mol) sulfur was added to the content of the stainless steel cylinder before it was sealed (see FIG. 14). Afterwards, 14.9 g (0.210 mol) chlorine gas was carefully condensed in the stainless steel cylinder reactor—and the pressure at room temperature was 39 PSIG. The reactor was left to stand undisturbed at room temperature, and conversion to $SF_4$ gas was achieved after 120 h. This is confirmed by decrease of the initial pressure from 39 PSIG to 33 PSIG, the FTIR spectrum of the gaseous content of the reactor, and gravimetric weight of cryogenically condensed product. Powder XRD analyses show that the byproducts of this process are $U_3O_8$ and KCl. A determination of the uranium content of the $SF_4$ gas was obtained by analyzing the aliquot from impinging the gas into water on an inductively coupled mass spectrometer (ICPMS, Perkins Elmer's ELAN-DRC II). This reaction is reported as experiment #4 in Table 8.

Example 2

Reaction of Uranium Tetrafluoride and Potassium Hydroxide

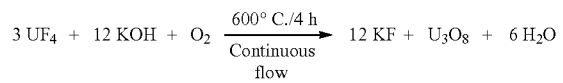

$$3\,UF_4 + 12\,KOH + O_2 \xrightarrow[\text{Continuous flow}]{600^\circ C./4\,h} 12\,KF + U_3O_8 + 6\,H_2O$$

Step One: 35.2 g (0.112 mol) Uranium tetrafluoride (International Bio-Analytical Laboratories Inc, Boca Raton, Fla.) and 22.5 g (0.402 mol) crushed potassium hydroxide pellets (Sigma Aldrich Co.) were placed in a 300 cc stainless steel cylinder that was then fitted into a set up illustrated in FIG. 13. A PALL Gaskleen V filter was placed in the outlet of the continuous flow of 550 standard cubic centimeter (sccm) dry air through the cylinder reactor. The supply of dry air is carefully controlled through online regulator and mass flow meter. The heater is powered on, and controlled to 600° C. for 4 h. During this period, droplets of water from the reaction were noticeable in the hose that connects the vent to the KOH scrubber. Any residual water was removed by vacuum of the isolated reactor, through the Gaskleen filter. Flow of dry air continued after heater power was turned off, until the temperature dropped to 100° C. Powder X-Ray diffraction of the resulting byproduct of this process showed that all $UF_4$ had reacted, and that $U_3O_8$ was the only uranium byproduct. Based on reaction stoichiometry, 3.6 g water should be eliminated from the reactor in a quantitative conversion, and weight loss of 7.2 g was confirmed. Thus, the reactor would contain 23.3 g (0.402 mol) KF, and 31.56 g (0.034 mol) $U_3O_8$.

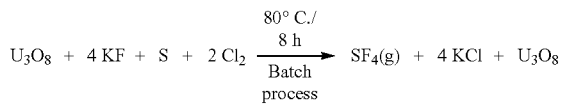

$$U_3O_8 + 4\,KF + S + 2\,Cl_2 \xrightarrow[\text{Batch process}]{80^\circ C./8\,h} SF_4(g) + 4\,KCl + U_3O_8$$

Step Two: The reactor was opened under inert atmosphere, and then 3.0 g (0.094 mol) sulfur was added to the content of the stainless steel cylinder before it was sealed. Afterwards, 15.0 g (0.212 mol) chlorine gas was carefully condensed into the stainless steel cylinder reactor—and the pressure at room temperature was 40 PSIG. The reactor was heated with thermostat regulation at 80° C. for 8 h. Upon cooling, the pressure has dropped to BB PSIG, indicating that CC % conversion to $SF_4$ gas was achieved. Further evidence was obtained from the gravimetric weight of cryogenically condensed product, that is, 10.1 g (99.8% of theoretical possible). Powder XRD analyses show that the byproducts of this process are $U_3O_8$ and KCl. A determination of the uranium content of the $SF_4$ gas was obtained by analyzing the aliquot from impinging the gas into water on an inductively coupled mass spectrometer (ICPMS, Perkins Elmer's ELAN-DRC II). This reaction is reported as experiment #6 in Table 8.

Example 3

Reaction of Uranium Tetrafluoride and Cesium Hydroxide

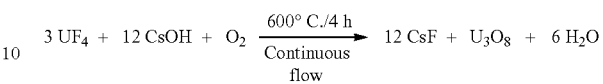

$$3\,UF_4 + 12\,CsOH + O_2 \xrightarrow[\text{Continuous flow}]{600^\circ C./4\,h} 12\,CsF + U_3O_8 + 6\,H_2O$$

Step One: 35.1 g (0.112 mol) Uranium tetrafluoride (International Bio-Analytical Laboratories, Inc, Boca Raton, Fla.) and 74.5 g (0.442 mol) cesium hydroxide monohydrate ($CsOH.H_2O$) powder (Sigma Aldrich Co.) were placed in a 300 cc stainless steel cylinder that was then fitted into a set up illustrated in FIG. 13. A PALL Gaskleen V filter was placed in the outlet of the continuous flow of 550 sccm dry air through the cylinder reactor. The supply of dry air is carefully controlled through online regulator and mass flow meter. The heater is powered on, and controlled to 600° C. for 4 h. During this period, droplets of water from the reaction were noticeable in the hose that connects the vent to the KOH scrubber. Any residual water was removed by vacuum of the isolated reactor, through the Gaskleen filter. Flow of dry air continued after heater power was turned off, until the temperature dropped to 100° C. X-Ray diffraction of the resulting byproduct of this process showed that all $UF_4$ had reacted, and that $U_3O_8$ was the only uranium byproduct. Based on reaction stoichiometry, 4.7 g water should be eliminated from the reactor in a quantitative conversion, and weight loss of 9.2 g was confirmed. Thus, the reactor contained 67.14 g (0.442 mol) anhydrous CsF, and 34.70 g (0.037 mol) $U_3O_8$.

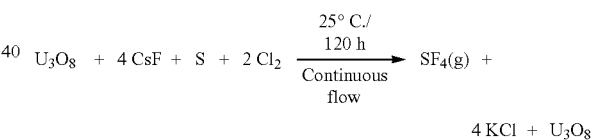

$$U_3O_8 + 4\,CsF + S + 2\,Cl_2 \xrightarrow[\text{Continuous flow}]{25^\circ C./120\,h} SF_4(g) + 4\,KCl + U_3O_8$$

Step Two: The reactor was opened under inert atmosphere, and then 3.0 g (0.094 mol) sulfur was added to the content of the stainless steel cylinder before it was sealed (see FIG. 14). Afterwards, 14.9 g (0.210 mol) chlorine gas was carefully condensed into the stainless steel cylinder reactor—and the pressure at room temperature was 40 PSIG. The reactor was left to stand undisturbed at room temperature, and 100% conversion to $SF_4$ gas was achieved after 120 h. This is initially confirmed by decrease of the initial pressure from 41 PSIG to 20 PSIG—a confirmation that 2 mole equivalent $Cl_2$ is required to produce 1 mole equivalent $SF_4$ gas, according to the balanced stoichiometric equation. Further evidence was obtained from the FTIR spectrum of the gaseous content of the reactor, and gravimetric weight of cryogenically condensed product, that is 10 g (98.8% of theoretical possible). Powder XRD analyses show that the byproducts of this process are $U_3O_8$ and KCl. A determination of the uranium content of the $SF_4$ gas was obtained by analyzing the aliquot from impinging the gas into water on an inductively coupled mass spectrometer (ICPMS, Perkins Elmer's ELAN-DRC II). This reaction is reported as experiment #5 in Table 8.

Example 4

Reaction of Uranium Tetrafluoride and Cesium Hydroxide Monohydrate

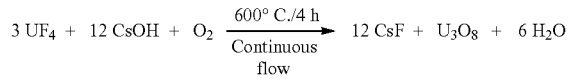

$$3\ UF_4 + 12\ CsOH + O_2 \xrightarrow[\text{Continuous flow}]{600°\ C./4\ h} 12\ CsF + U_3O_8 + 6\ H_2O$$

Step One: 35.2 g (0.112 mol) Uranium tetrafluoride (International Bio-Analytical Laboratories, Inc, Boca Raton, Fla.) and 74.6 g (0.443 mol) cesium hydroxide monohydrate (CsOH.H$_2$O) powder (Sigma Aldrich Co.) were placed in a 300 cc stainless steel cylinder that was then fitted into a set up illustrated in FIG. 13. A PALL Gaskleen V filter was placed in the outlet of the continuous flow of 550 sccm dry air through the cylinder reactor. The supply of dry air is carefully controlled through online regulator and mass flow meter. The heater is powered on, and controlled to 600° C. for 4 h. During this period, droplets of water from the reaction were noticeable in the hose that connects the vent to the KOH scrubber. Any residual water was removed by vacuum of the isolated reactor, through the Gaskleen filter. Flow of dry air continued after heater power was turned off, until the temperature dropped to 100° C. X-Ray diffraction of the resulting byproduct of this process showed that all UF$_4$ had reacted, and that U$_3$O$_8$ was the only uranium byproduct. Based on reaction stoichiometry, 4.7 g water should be eliminated from the reactor in a quantitative conversion, and weight loss of 9.7 g was confirmed. Cesium hydroxide is extremely hygroscopic, and the difference in amount of water lost is a reflection of moisture absorbed during the transfer of the CsOH.H$_2$O into the reactor cylinder. Thus the reactor contained 67.29 g (0.443 mol) anhydrous CsF, and 34.70 g (0.037 mol) U$_3$O$_8$.

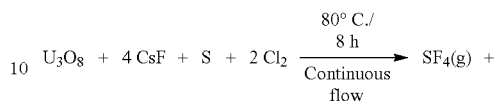

$$U_3O_8 + 4\ CsF + S + 2\ Cl_2 \xrightarrow[\text{Continuous flow}]{80°\ C./8\ h} SF_4(g) +$$

$$4\ KCl + U_3O_8$$

Step Two: The reactor was opened under inert atmosphere, and then 3.0 g (0.094 mol) sulfur was added to the content of the stainless steel cylinder before it was sealed (see FIG. 14). Afterwards, 15.1 g (0.213 mol) chlorine gas was carefully condensed into the stainless steel cylinder reactor—and the pressure at room temperature was 40 PSIG. The reactor was heated with thermostat regulation at 80° C. for 8 h. Upon cooling, the pressure has dropped to 19 PSIG, indicating that 100% conversion to SF$_4$ gas was achieved. Further evidence was obtained from the gravimetric weight of cryogenically condensed product, that is, 10.1 g (99.8% of theoretical possible). Powder XRD analyses show that the byproducts of this process are U$_3$O$_8$ and KCl. A determination of the uranium content of the SF$_4$ gas was obtained by analyzing the aliquot from impinging the gas into water on an inductively coupled mass spectrometer (ICPMS, Perkins Elmer's ELAN-DRC II). This reaction is reported as experiment #6 in Table 8.

TABLE 8

Production of SF$_4$ from UF$_4$ by two-step NIFUT technology and directly from MF$_n$ $$3\ UF_4 + 12\ KOH + O_2 \xrightarrow[\text{Continuous flow}]{600°\ C.} 12\ KF + U_3O_8 + 6\ H_2O$$

$$3\ UF_4 + 12\ CsOH + O_2 \xrightarrow[\text{Continuous flow}]{600°\ C.} 12\ CsF + U_3O_8 + 6\ H_2O$$

$$4\ KF\ (w/U_3O_8) + S + 2\ Cl_2 \rightarrow SF_4\ (g) + 4\ KCl$$
$$4\ CsF\ (w/U_3O_8) + S + 2\ Cl_2 \rightarrow SF_4\ (g) + 4\ CsCl$$

| Experiment | UF$_4$ Added | M—OH | Equiv. M—F added | Equiv. U$_3$O$_8$ byproduct | H$_2$O removed | Sulfur added | Halogen added | Process condition |
|---|---|---|---|---|---|---|---|---|
| 1 | — | — | 6.4 g CsF 0.042 mol | — | — | 0.67 g 0.021 mol | 4.4 g Cl$_2$ 0.062 mol | Batch, RT/72 h |
| 2 | — | — | 12.5 mol CsF 0.082 mol | — | — | 1.3 g 0.041 mol | 22.5 g Br$_2$ 0.141 mol | Batch, RT/72 h |
| 3 | 35.0 g 0.112 mol | 22.5 g KOH 0.402 mol | 23.3 g KF 0.402 mol | 31.56 g 0.034 mol | 7.2 g 0.4 mol | 3.0 g 0.094 mol | 14.9 g Cl$_2$ 0.210 mol | Batch, RT/120 h |
| 4 | 35.2 g 0.112 mol | 22.5 g KOH 0.402 mol | 23.3 g KF 0.402 mol | 31.56 g 0.034 mol | 9.0 g 0.5 mol | 3.0 g 0.094 mol | 15.0 g Cl$_2$ 0.212 mol | Batch, 80° C./8 h |
| 5 | 35.1 g 0.112 mol | 74.5 g CsOH•H$_2$O 0.442 mol | 67.14 g CsF 0.442 mol | 34.70 g 0.037 mol | 9.2 g 0.511 mol | 3.0 g 0.094 mol | 15.1 g Cl$_2$ 0.213 mol | Batch, RT/120 h |
| 6 | 35.2 g 0.112 mol | 74.6 g CsOH•H$_2$O 0.443 mol | 67.29 g CsF 0.443 mol | 34.70 g 0.037 mol | 13.8 g 0.767 mol | 3.0 g 0.094 mol | 15.0 g Cl$_2$ 0.212 mol | Batch, 80° C./8 h |

TABLE 8-continued

Production of $SF_4$ from $UF_4$ by two-step NIFUT technology and directly from $MF_n$ $$3\ UF_4 + 12\ KOH + O_2 \xrightarrow[\text{Continuous flow}]{600°\ C.} 12\ KF + U_3O_8 + 6\ H_2O$$

$$3\ UF_4 + 12\ CsOH + O_2 \xrightarrow[\text{Continuous flow}]{600°\ C.} 12\ CsF + U_3O_8 + 6\ H_2O$$

$$4\ KF\ (w/U_3O_8) + S + 2\ Cl_2 \rightarrow SF_4\ (g) + 4\ KCl$$
$$4\ CsF\ (w/U_3O_8) + S + 2\ Cl_2 \rightarrow SF_4\ (g) + 4\ CsCl$$

| Experiment | Products | | Analysis of products Gas (FTIR) Solid (XRD) |
|---|---|---|---|
| | $SF_4$ collected | M—Cl/M—Br byproduct | |
| 1 | | √ | $SF_4$, 90%, $SOF_2$, 5%, $Cl_2$, 20%, HF, 5% | — |
| 2 | | √ | $SF_4$, 70%, $SOF_2$, 5%, $Cl_2$, 20%, HF, 5% | — |
| 3 | | √ | $SF_4$, 99%, $SOF_2$, 0.5%, HF, 0.5% | $U_3O_8$, KCl |
| 4 | | √ | $SF_4$, 99%, $SOF_2$, 1%, HF, 0.5% | $U_3O_8$, KCl |
| 5 | | √ | $SF_4$, >99%, $SOF_2$, 0.4%, HF, 0.5% | $U_3O_8$, KCl |
| 6 | | √ | $SF_4$, >99%, $SOF_2$, 0.4%, HF, 0.5% | $U_3O_8$, KCl |

Figure 11:
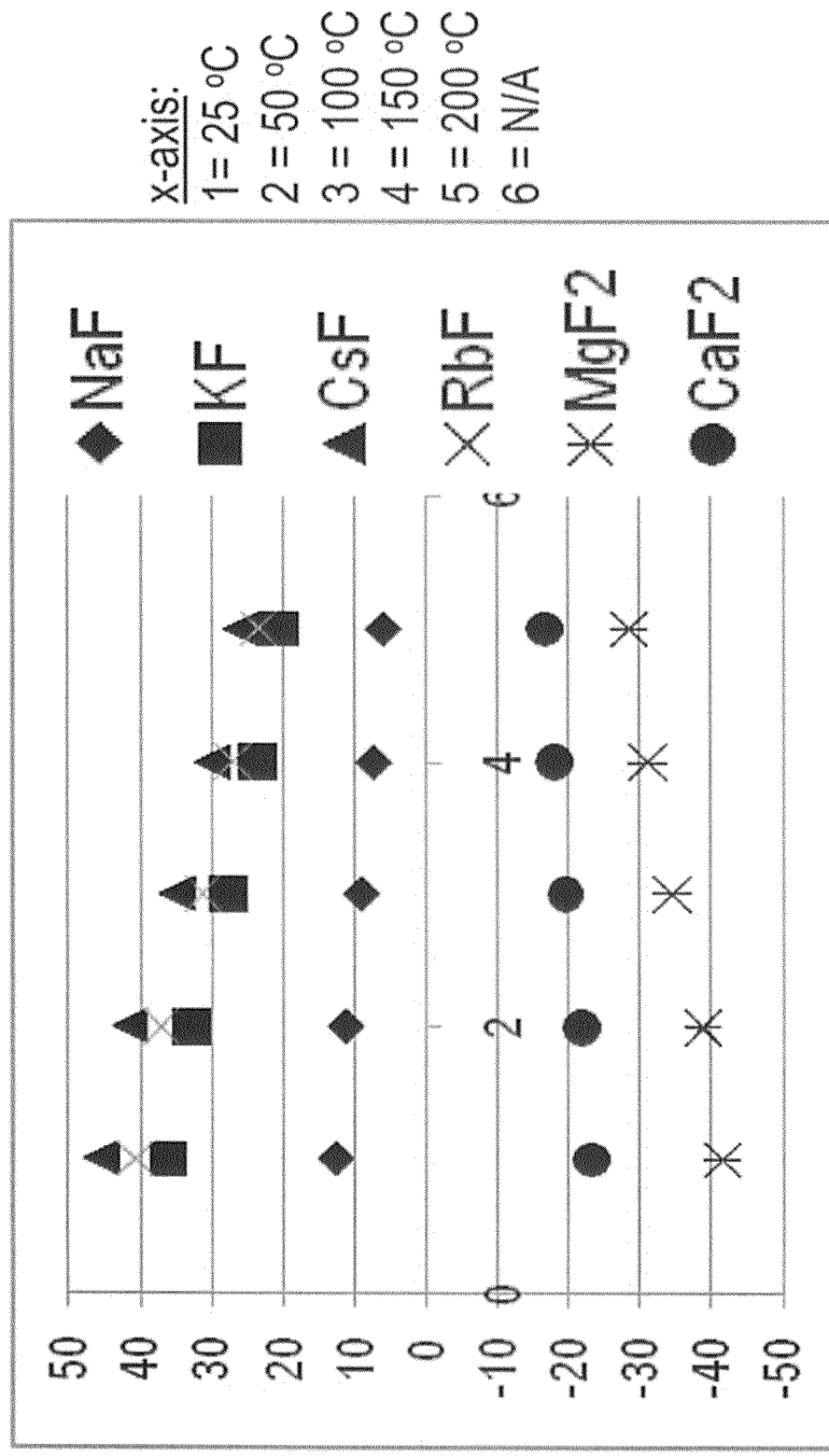
FIG. 11 shows a summary of logarithms of equilibrium constants listed in Table 6.
Figure 12:
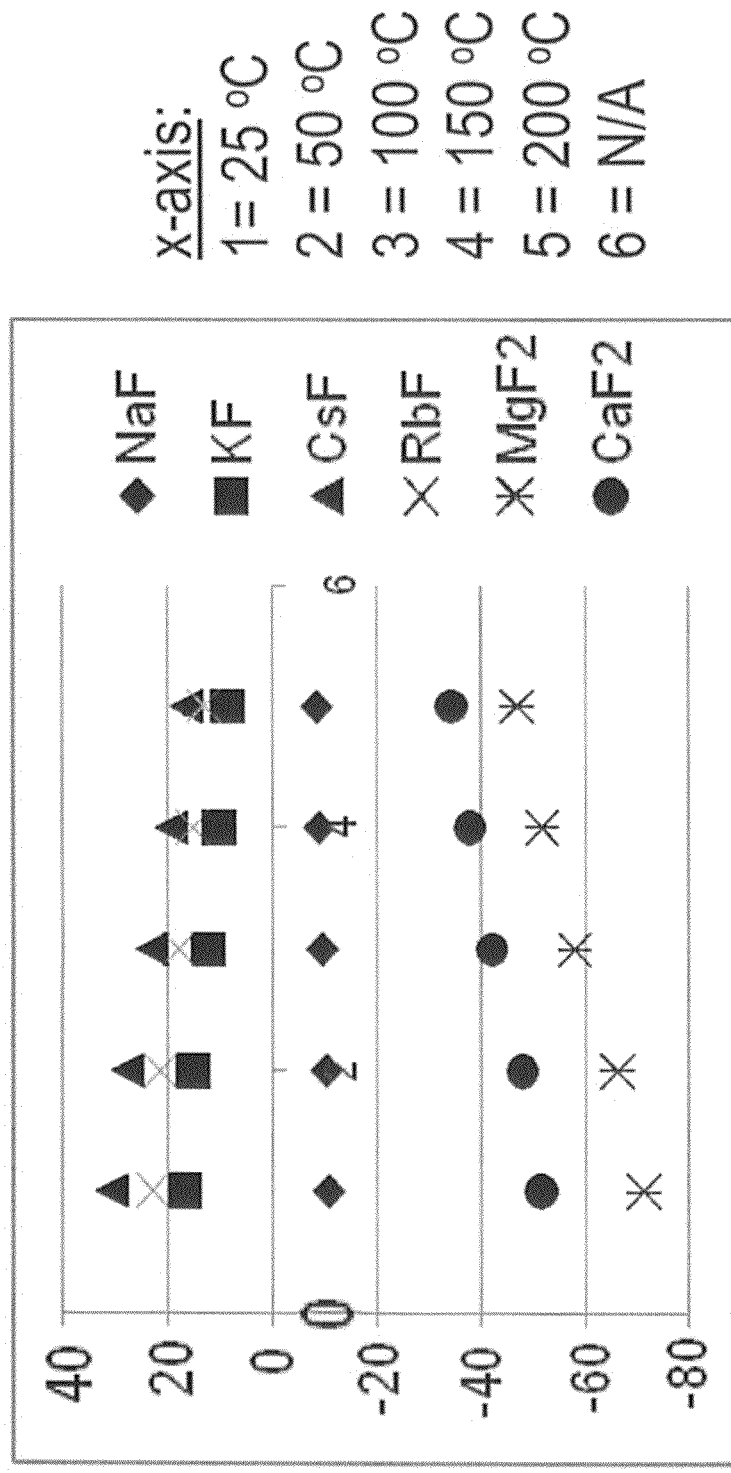
FIG. 12 shows a summary of logarithms of equilibrium constants listed in Table 6.

[1]XRD spectra of post-react solid byproducts of experiments 5 and 6 are shown in FIGS. 11 and 12.
[2]$U_3O_8$ prepared from step 1 was preserved intact through the process conditions of experiments 1-6. No evidence of any reaction with $SF_4$.

What is claimed is:

1. A method for converting depleted uranium tetrafluoride ($UF_4$) to uranium free sulfur tetrafluoride and triuranium octaoxide ($U_3O_8$), comprising the steps of:
   heating in a first step a mixture of uranium tetrafluoride and an alkaline compound in a first step at 350 degrees C. to 650 degrees C. in a reaction chamber for 60 minutes to 240 minutes to produce a mixture of the respective alkaline fluoride and $U_3O_8$;
   continuously flushing said reaction chamber with dry air during heating;
   filtering reaction offgases to prevent particulate uranium from escaping from said reaction chamber;
   heating in a second step the mixture of the respective alkaline fluoride and $U_3O_8$ from said first step, combined with sulfur (S) and a halogen, at a temperature of 25 degrees C. to 80 degrees C., for 6 hours to 120 hours; to produce sulfur tetrafluoride ($SF_4$) gas, and solid of the corresponding metal halide and $U_3O_8$ as byproducts.

2. The method of claim 1 in which said alkaline compound comprises an alkaline oxide.

3. The method of claim 1 in which said alkaline oxide is cesium oxide.

4. The method of claim 2 in which said alkaline oxide is selected from the group consisting of sodium oxide, cesium oxide, and potassium oxide.

5. The method of claim 1 in which said halogen is bromine.

6. The method of claim 1 in which said halogen is chlorine.

7. A method for converting depleted uranium tetrafluoride ($UF_4$) to uranium free sulfur tetrafluoride and triuranium octaoxide ($U_3O_8$), comprising the steps of:
   heating in a first step a mixture of tetrafluoride and cesium oxide in a first step at 350 degrees C. to 650 degrees C. in a reaction chamber for 60 minutes to 240 minutes to produce a mixture of cesium fluoride and $U_3O_8$;
   continuously flushing said reaction chamber with dry air during heating;
   filtering reaction off gasses to prevent particulate uranium from escaping from said reaction chamber;
   heating in a second step the mixture of cesium fluoride and $U_3O_8$ from said first step, combined with sulfur (S) and chlorine, at a temperature of 25 degrees C. to 80 degrees C., for 6 hours to 120 hours; to produce sulfur tetrafluoride ($SF_4$) gas, and solid byproducts of cesium chloride (CsCl) and $U_3O_8$.

8. A method for converting depleted uranium tetrafluoride ($UF_4$) to uranium free sulfur tetrafluoride and triuranium octaoxide ($U_3O_8$), comprising the steps of:
   heating in a first step a mixture of uranium tetrafluoride and cesium hydroxide in a first step at 350 degrees C. to 650 degrees C. in a reaction chamber for 60 minutes to 240 minutes chamber to produce a mixture of cesium fluoride and $U_3O_8$;
   continuously flushing said reaction chamber with dry air during heating;
   filtering reaction offgases to prevent particulate uranium from escaping from said reaction;
   heating in a second step the mixture of cesium fluoride and $U_3O_8$ from said first step, combined with sulfur (S) and chlorine, at a temperature of 25 degrees C. to 80 degrees C., for 96 hours to 120 hours; to produce sulfur tetrafluoride ($SF_4$) gas, and solid byproducts of cesium chloride (CsCl) and $U_3O_8$.

9. The method of claim 1 in which said alkaline compound comprises an alkaline hydroxide.

10. The method of claim 4 in which said alkaline hydroxide is selected from the group consisting of Sodium hydroxide, potassium hydroxide and cesium hydroxide.

11. The method of claim 1 in which said halogen is selected from the group consisting of bromine and chlorine.

12. The method of claim 9 in which alkaline hydroxide is potassium hydroxide and said halogen is chlorine.

13. The method of claim 9 in which alkaline hydroxide is potassium hydroxide and said halogen is bromine.

14. The method of claim 9 in which alkaline hydroxide is cesium hydroxide and said halogen is bromine.

15. The method of claim 2 in which alkaline oxide is sodium oxide and said halogen is bromine.

16. The method of claim 1 in which alkaline oxide sodium oxide and said halogen is chlorine.

17. The method of claim 2 in which alkaline oxide is potassium oxide and said halogen is bromine.

18. The method of claim 1 in which alkaline oxide potassium oxide and said halogen is chlorine.

19. The method of claim 1 in which said heating step in said first step is heated to 400 degrees C.-600 degrees C.

20. The method of claim 1 in which further comprises a heating step with stirring in step two at 80° C. or less for less than 10 hours, and in which said halogen is bromine.

21. The method of claim 1 in which said heating step of step one include heating in inert atmosphere.

22. The method of claim 1 in which said heating step in step two is for less than 24 hours, and further comprises a stirring step two at 80° C. or less for less than 10 hours, and in which said halogen is bromine.

23. The method of claim 1 in which said heating step in step one is at room temperature for approximately 24 hours, and said heating step in step two is for less than 24 hours, and further comprises a stirring step two at 120° C. or less for less than 10 hours, and in which said halogen is chlorine.

24. The method of claim 1 which further comprises a cryogenic condensation step of gasses produced from step two.

* * * * *

UNITED STATES PATENT AND TRADEMARK OFFICE
CERTIFICATE OF CORRECTION

PATENT NO. : 8,367,026 B2  
APPLICATION NO. : 12/916276  
DATED : February 5, 2013  
INVENTOR(S) : Bamidele A. Omotowa Page 1 of 1

It is certified that error appears in the above-identified patent and that said Letters Patent is hereby corrected as shown below:

In the Specification

Column 1, line 4

Please insert the following paragraph under the paragraph heading, --Statement Regarding Federally Sponsored Research or Development--:
--This invention was made with Government support under NSF Award No. 1127186 (Title: "NIFUT Technology for recycling fluorides from Uranium Tetrafluoride") awarded by the National Science Foundation. The Government has certain rights in this invention. 45 CFR 650.4(f)(4).--

Signed and Sealed this  
Third Day of June, 2014

Michelle K. Lee  
*Deputy Director of the United States Patent and Trademark Office*